US012644592B2

(12) United States Patent
Allen et al.

(10) Patent No.: US 12,644,592 B2
(45) Date of Patent: Jun. 2, 2026

(54) CENTRALIZED APPLIANCE HUBS AND RELATED SYSTEMS AND METHODS

(71) Applicant: Overcast Innovations LLC, Seattle, WA (US)

(72) Inventors: Dean Allen, Seattle, WA (US); Jay Martin, Bainbridge Island, WA (US); Anthony Lee Larson, Seattle, WA (US); James Rooney, Seattle, WA (US); Erik Hanson, Renton, WA (US); Jon McClure, Seattle, WA (US); Josh Bolton, Portland, OR (US)

(73) Assignee: OVERCAST INNOVATIONS LLC, Seattle, WA (US)

( * ) Notice: Subject to any disclaimer, the term of this patent is extended or adjusted under 35 U.S.C. 154(b) by 652 days.

(21) Appl. No.: 17/956,713

(22) Filed: Sep. 29, 2022

(65) Prior Publication Data

US 2023/0094666 A1 Mar. 30, 2023

Related U.S. Application Data

(60) Provisional application No. 63/249,693, filed on Sep. 29, 2021.

(51) Int. Cl.
*F21V 33/00* (2006.01)
*F24F 13/078* (2006.01)
*F24F 13/32* (2006.01)

(52) U.S. Cl.
CPC ........ *F21V 33/0088* (2013.01); *F24F 13/078* (2013.01); *F24F 13/32* (2013.01); *F24F 2221/36* (2013.01)

(58) Field of Classification Search
CPC .. F21V 33/00; F21V 33/0088; F21V 33/0092; F24F 13/00; F24F 13/078; F24F 13/30; F24F 13/32; F24F 2221/36
See application file for complete search history.

(56) References Cited

U.S. PATENT DOCUMENTS 3,600,591 A * 8/1971 Thier ..................... G01N 21/89 250/559.46
3,660,591 A * 5/1972 Schultz .................. A47C 21/00 5/2.1

(Continued)

FOREIGN PATENT DOCUMENTS

CN 106545117 A 3/2017
CN 113047505 A 6/2021

(Continued)

OTHER PUBLICATIONS

International Search Report and Written Opinion issued for PCT/US2022/045274 mailed Jan. 20, 2023 by Korean International Search Authority, 12 pages.

(Continued)

*Primary Examiner* — Chi Q Nguyen
(74) *Attorney, Agent, or Firm* — Perkins Coie LLP

(57) ABSTRACT

The present technology is generally directed to appliance hubs and related systems and methods. In some embodiments, an appliance hub includes a frame assembly and one or more panel assemblies mounted thereto. Individual panels of the panel assemblies can be removably coupled to the frame. At least some of the panels can include one or more functional components, such as one lighting elements, acoustic controls, speakers, vents, mechanical/electrical/plumbing ("MEP") components, and/or other devices. Accordingly, the frame assembly can be used to manufacture many differently configured appliance hubs with different arrangements of panels and devices positioned thereon. Further, the ability to remove or partially remove individual panels of the appliance hubs after the appliance hub is installed in a ceiling or other upper portion of a room allows for maintenance of existing devices of the appliance hub and/or replacement of devices or the panels themselves.

36 Claims, 23 Drawing Sheets

(56) References Cited

U.S. PATENT DOCUMENTS

| | | | | | |
|---|---|---|---|---|---|
| 4,702,046 | A | 10/1987 | Haugen et al. | | |
| 4,753,055 | A * | 6/1988 | Durham, Jr. | A61G 12/005 | 5/2.1 |
| 7,219,472 | B2 * | 5/2007 | Gallant | A61G 7/0005 | 52/36.2 |
| 7,455,535 | B2 | 11/2008 | Insalaco et al. | | |
| 7,470,861 | B1 | 12/2008 | Ross et al. | | |
| 8,522,488 | B1 * | 9/2013 | Newkirk | A61G 12/005 | 52/387 |
| 8,683,750 | B2 * | 4/2014 | Gallant | E04B 2/745 | 52/36.2 |
| 9,010,031 | B1 * | 4/2015 | Webb | A61G 12/00 | 52/36.5 |
| 9,190,791 | B1 | 11/2015 | Jaena et al. | | |
| 9,472,912 | B2 | 10/2016 | Schirmeier | | |
| 10,030,398 | B2 | 7/2018 | Byers et al. | | |
| 10,344,954 | B1 | 7/2019 | Tischler et al. | | |
| 10,801,761 | B2 | 10/2020 | Dobson | | |
| 11,465,918 | B2 | 10/2022 | Bitterly et al. | | |
| 11,487,307 | B2 | 11/2022 | Allen et al. | | |
| 11,505,141 | B2 | 11/2022 | Jones et al. | | |
| 11,732,877 | B2 * | 8/2023 | Garrett | F21V 21/005 | 362/249.02 |
| 11,796,190 | B2 | 10/2023 | Oh et al. | | |
| 11,886,210 | B2 | 1/2024 | Allen et al. | | |
| 12,070,639 | B2 * | 8/2024 | Allen | F24F 13/32 | |
| 12,285,367 | B2 * | 4/2025 | Patzer | E04F 13/072 | |
| 2002/0011956 | A1 | 1/2002 | Ito | | |
| 2002/0141181 | A1 | 10/2002 | Bailey | | |
| 2004/0117506 | A1 | 6/2004 | Ito | | |
| 2004/0118068 | A1 | 6/2004 | Kliegle et al. | | |
| 2004/0121114 | A1 | 6/2004 | Ipiana | | |
| 2004/0216895 | A1 | 11/2004 | Boyce | | |
| 2005/0141216 | A1 | 6/2005 | McCarthy | | |
| 2006/0060361 | A1 | 3/2006 | Pounder et al. | | |
| 2006/0113608 | A1 | 6/2006 | Ohwada et al. | | |
| 2006/0162566 | A1 | 7/2006 | Kondo | | |
| 2006/0163566 | A1 | 7/2006 | Kawaraya et al. | | |
| 2007/0077795 | A1 | 4/2007 | Insalaco et al. | | |
| 2007/0095659 | A1 | 5/2007 | Yasuda | | |
| 2008/0037241 | A1 | 2/2008 | Von Der Brelie | | |
| 2008/0168841 | A1 | 7/2008 | Matsuo | | |
| 2008/0259616 | A1 | 10/2008 | Morgan et al. | | |
| 2008/0268386 | A1 | 10/2008 | Lin | | |
| 2009/0223682 | A1 | 9/2009 | Ramos | | |
| 2009/0277971 | A1 | 11/2009 | Scott | | |
| 2009/0301601 | A1 | 12/2009 | Enerson | | |
| 2012/0023853 | A1 | 2/2012 | Gerkes et al. | | |
| 2012/0155027 | A1 | 6/2012 | Broome | | |
| 2012/0243227 | A1 * | 9/2012 | Shimizu | F21V 19/0045 | 362/249.01 |
| 2013/0233532 | A1 | 9/2013 | Imwalle | | |
| 2014/0352988 | A1 | 12/2014 | Aldino et al. | | |
| 2015/0122513 | A1 | 5/2015 | Miller et al. | | |
| 2016/0011067 | A1 | 1/2016 | Rothstein | | |
| 2016/0156169 | A1 | 6/2016 | Jaena et al. | | |
| 2016/0209076 | A1 | 7/2016 | Hirsch et al. | | |
| 2016/0274024 | A1 | 9/2016 | Han | | |
| 2017/0021208 | A1 | 1/2017 | Dor-el | | |
| 2017/0064872 | A1 | 3/2017 | Rogers | | |
| 2017/0089047 | A1 | 3/2017 | Kovscek | | |
| 2017/0101618 | A1 | 4/2017 | Kamen et al. | | |
| 2017/0122580 | A1 | 5/2017 | Karamanos et al. | | |
| 2017/0235126 | A1 | 8/2017 | Didomenico | | |
| 2017/0288184 | A1 | 10/2017 | Schnakofsky et al. | | |
| 2018/0027638 | A1 | 1/2018 | Takacs | | |
| 2018/0066838 | A1 | 3/2018 | Huang et al. | | |
| 2018/0139517 | A1 | 5/2018 | Schwartz et al. | | |
| 2018/0142935 | A1 | 5/2018 | Jacobi | | |
| 2018/0180304 | A1 | 6/2018 | Olsen | | |
| 2018/0220546 | A1 | 8/2018 | Meldrum et al. | | |
| 2021/0016119 | A1 | 1/2021 | Allen et al. | | |
| 2021/0142601 | A1 * | 5/2021 | Schoenfelder | H04L 67/125 | |
| 2021/0172615 | A1 | 6/2021 | Oh et al. | | |
| 2021/0172648 | A1 | 6/2021 | Oh et al. | | |
| 2021/0265776 | A1 | 8/2021 | Moulin et al. | | |
| 2022/0170617 | A1 | 6/2022 | Cai et al. | | |
| 2023/0004177 | A1 | 1/2023 | Allen et al. | | |
| 2023/0094666 | A1 | 3/2023 | Allen et al. | | |
| 2024/0337408 | A1 * | 10/2024 | Andrade, Jr. | F24F 11/58 | |

FOREIGN PATENT DOCUMENTS

| | | | |
|---|---|---|---|
| EP | 2451009 | A1 | 5/2012 |
| EP | 3875844 | A1 | 9/2021 |
| JP | H0518037 | A | 1/1993 |
| JP | 2013072626 | A | 4/2013 |
| JP | 2020165211 | A | 10/2020 |
| KR | 200334976 | Y1 | 12/2003 |
| KR | 20190044213 | A | 4/2019 |
| WO | 2011063673 | A1 | 6/2011 |
| WO | 2013065935 | A1 | 5/2013 |
| WO | 2013085935 | A1 | 6/2013 |
| WO | 2017184960 | A1 | 10/2017 |

OTHER PUBLICATIONS

International Search Report and Written Opinion issued for PCT/US2019/040198 and mailed Oct. 31, 2019, 13 pages.

International Search Report and Written Opinion issued for PCT/US2020/037293 and mailed on Sep. 17, 2020, 15 pages.

Extended European Search Report issued for European Patent Application No. 22877348.7 mailed Nov. 19, 2025, 9 pages.

* cited by examiner

CENTRALIZED APPLIANCE HUBS AND RELATED SYSTEMS AND METHODS

CROSS-REFERENCE TO RELATED APPLICATION

The present application claims priority to U.S. Provisional App. No. 63/249,693, filed Sep. 29, 2021, entitled CENTRALIZED APPLIANCE HUB AND RELATED METHODS, the entirety of which is incorporated by reference herein.

TECHNICAL FIELD

The present technology generally relates to centralized appliance hubs and related systems and methods.

BACKGROUND

As energy codes have become more stringent, the costs associated with controlling indoor climates have risen. Many traditional climate control systems, such as variable air volume ("VAV") systems and constant air volume ("CAV") systems, are now becoming cost-prohibitive due to high electricity usage associated with moving air and the rising costs of electricity. The costs associated with installing and maintaining climate control systems are also very high, as multi-person crews are often necessary to custom-fit wiring, ducting, piping, and other overhead in a given structure.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1A:
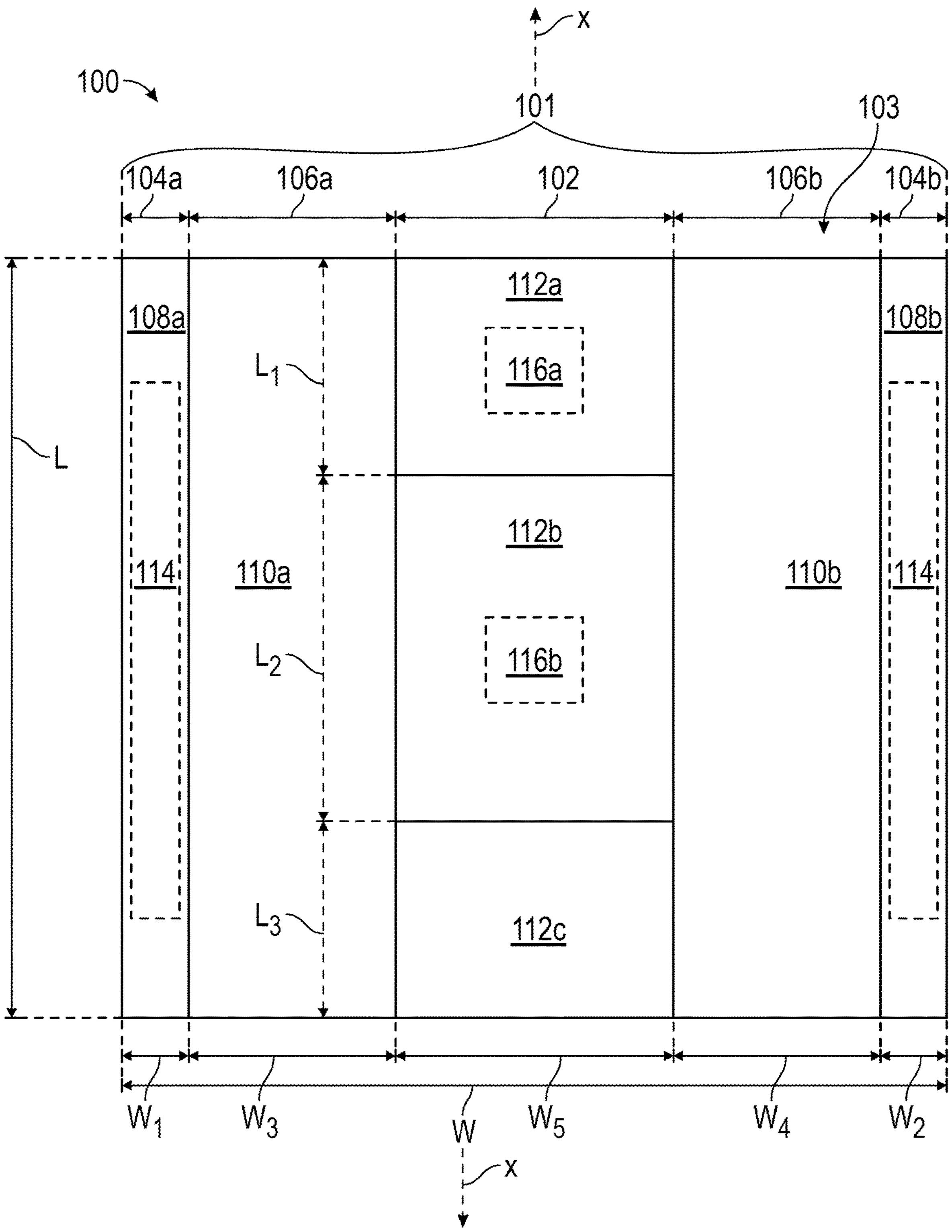
FIG. 1A is a partially schematic front view of an appliance hub configured in accordance with embodiments of the present technology.

The present technology is generally directed to centralized appliance hubs and associated systems and methods for use in enclosures and including panel assemblies with one or more modular and/or removable panels. In some embodiments, an appliance hub includes one or more panel assemblies configured to be mounted to a frame assembly. Each of the panel assemblies can include one or more panels, and individual ones of the panels can be configured to be removably coupled to the frame. In some embodiments, at least one of the panels can include one or more functional components, such as one or more lighting elements, sensors, climate control devices, fire suppression apparatuses, communication devices, acoustic controls, speakers, forced air vents, mechanical/electrical/plumbing ("MEP") components, and/or other devices. The frame can be configured to support a plurality of various configurations and/or arrangements of the panels and/or panel assemblies. One or more of the panels can be partially or fully removed from the frame, including after the appliance hub has been installed in a ceiling, to allow for maintenance and/or repair, and/or replacement with one or more other panels, such as to add, remove, or otherwise change one or more of the panels, the lighting elements and/or the devices included in the appliance hub. Accordingly, the same frame can be used to manufacture many differently-configured and/or differently-arranged appliance hubs, and/or one or more of the lighting elements, devices, panels, and/or panel assemblies included in an appliance hub can be removed and/or replaced to change a configuration of the appliance hub.

Specific details of several embodiments of appliance hubs for use in enclosures, as well as associated systems and methods, are described below. As used herein, an "enclosure" can be a room or other enclosed or partially enclosed space, including spaces having full ceilings, partial ceilings, no ceilings, complete wall perimeters, partial-perimeter walls (e.g., one or more open sides), and/or other indoor or partially indoor spaces. The appliance hubs, sometimes referred to as clouds or acoustic clouds, can be positioned in the upper portions of enclosures. The appliance hubs can be installed such that they do not create plenum within the enclosure. In some embodiments, the space between the appliance hubs and each other/the ceiling can allow for additional light (e.g., sunlight) to fill a space than would be the case if the appliance hubs formed a plenum. In some applications, the appliance hubs can be mounted along or near a wall of an enclosure. The enclosures can include, but are not limited to, classrooms, offices, concert halls, foyers, cafeterias, restaurants, residential rooms, warehouses, etc. The appliance hubs can be installed in original construction projects, or retrofitted to existing structure or enclosure. The appliances can include a climate control apparatus configured to regulate a temperature within the enclosure, one or more lighting elements configured to provide light within the enclosure, a fire suppression apparatus configured to suppress flames within the enclosure, a plurality of fluid lines configured to provide fluid service and return to one or both of the fire suppression apparatus and the climate control apparatus, and/or a plurality of electrical connections configured to provide electrical power and/or data to at least one of the climate control apparatus, the fire suppression apparatus, and the one or more lighting elements. As used herein, "fluid" refers to one or both of a liquid (e.g., water, refrigerant, etc.) and a gas (air, conditioned air, etc.). Preferably, the appliances include one or more of a sound level sensor, a motion sensor (e.g., an infrared sensor), a camera, a microphone, an air quality monitor, a carbon dioxide sensor, a carbon monoxide sensor, a smoke detector, a light level sensor, a heat sensor, a room temperature sensor, a dew point sensor, and a humidity sensor. Additionally details regarding appliance hubs are described further below, and can be found in U.S. application Ser. No. 16/459,509, filed Jul. 1, 2019, the entirety of which is hereby incorporated by reference herein.

FIG. 1A is a partially schematic front view of an appliance hub 100 (also referred to as a "hub," "appliance," or "appliance device") configured in accordance with embodiments of the present technology. The appliance hub 100 can have a length L, as measured parallel to the floor of the enclosure in which the appliance hub 100 is installed (or parallel to a wall on which the appliance hub 100 is installed in some embodiments), of between about 36 inches and about 108 inches, such as at least 48 inches, 60 inches, 72 inches, 84 inches, 96 inches, or another length therebetween. Similarly, the appliance hub 100 can have a width W, as measured parallel to the floor of the enclosure in which the appliance hub 100 is installed (or parallel to a wall on which the appliance hub 100 is installed in some embodiments), of between about 36 inches and about 84 inches, such as at least 48 inches, 60 inches, 72 inches, or another width therebetween. Accordingly, the length L can be greater than, equal to, or less than the width W. When observed from below, the appliance hub 100 can have a generally rounded shape (e.g., circular or oval shape), a polygonal shape (e.g., triangular, square, rectangular, etc.), an irregular shape (e.g., a cloud shape, an asymmetric shape, etc.), and/or some combination thereof. In some applications, the appliance hub 100 is at least partially covered by a non-rigid, roughened, irregular, soft, and/or some other type of material. Sound-absorbing materials (e.g., open cell foams, sponges, porous materials, resonant absorber material, polyester, and/or other materials) may be used to cover or form the outer surface of all or a portion of the appliance hub 100. The materials (e.g., sound-absorbing materials) used to cover the appliance hub 100 can be fire-resistant (e.g., UL 723, NFPA 286, ASTM E84, and/or ETL compliant). In some embodiments, the materials are produced from recycled products. In some applications, other components of the appliance hub are fire-resistant and/or UL/ETL compliant (e.g., chilled beam(s), light fixture(s), controls, power supplies, etc.).

The appliance hub 100 can include one or more panel assemblies 101 (also referred to as substrate assemblies). In the illustrated embodiment, for example, the appliance hub 100 includes a first or central panel assembly 102, a second or left outermost panel assembly 104*a*, a third or right outermost panel assembly 104*b*, a fourth or left intermediate panel assembly 106*a*, and a fifth or right intermediate panel assembly 106*b*. The second panel assembly 104*a* can be positioned on a first side of the first panel assembly 102, the third panel assembly 104*b* can be positioned on a second side of the first panel assembly 102 opposite the first side, the fourth panel assembly 106*a* can be positioned between the first panel assembly 102 and the second panel assembly 104*a*, and the fifth panel assembly 106*b* can be positioned between the first panel assembly 102 and the third panel assembly 104*b*. Accordingly, and as shown in the embodiment illustrated in FIG. 1A, the second panel assembly 104*a* and the third panel assembly 104*b* together define the left and right outermost edges of the appliance hub 100. Each of the panel assemblies 101 can extend along the length L of the of appliance hub 100 and along a respective portion of the width W of the appliance hub 100. Although five panel assemblies 101 are shown in the illustrated embodiment, in other embodiments the appliance hub 100 can include more or fewer panel assembly, such as at least one, two, three, four, six, seven, or more panel assemblies.

Individual ones of the panel assemblies 101 can include one or more panels 103 (also referred to as substrates). In the illustrated embodiment, for example, the first panel assembly 102 includes three panels 112 (individually identified as a first or upper panel 112*a*, a second or middle panel 112*b*, and a third or lower panel 112*c* in FIG. 1A), the second panel assembly 104*a* includes a first or left outermost panel 108*a*, the third panel assembly 104*b* includes a second or right outermost panel 108*b*, the fourth panel assembly 106*a* includes a third or left intermediate panel 110*a*, the fifth panel assembly 106*b* includes a fourth or right intermediate panel 110*b*. In other embodiments, individual ones of the panel assemblies 101 can include more or fewer panels, such as at least one, two, three, four, five, six, seven, eight, or more panels. In these and other embodiments, individual ones of the panels 103 can extend along all or a portion of the length L and/or the width W of the appliance hub 100. The respective widths of individual ones of the panels can be between about 6 inches and about 30 inches, such as at least 10 inches, at least 16 inches, at least 26 inches, or another suitable width therebetween. In the illustrated embodiment, the first panel 108*a*, the second panel 108*b*, the third panel 110*a*, and the fourth panel 110*b* each extend along the length L of the appliance hub 100 and have respective widths $W_{1-4}$ that each correspond to a portion of the width W of the appliance hub 100. With continued reference to the illustrated embodiment, the three panels 112*a-c* each have a same width $W_5$ and a respective length $L_{1-3}$ that corresponds to a portion of the length L of the appliance hub 100. The length and/or the width of any one of the panels 103 can be greater than, equal to, or less than the length and/or width of one or more of the other panels 103.

One or more of the panels 103 can be configured to absorb, attenuate, and/or dampen sound (e.g., in an enclosure); reflect light; contribute to an aesthetic theme of the enclosure in which the appliance hub is installed; and/or provide other desired functions. In some embodiments, one or more of the panels 103 are perforated, and/or include other finishes, such as wood-paneling, sound-absorbing material, etc. In some embodiments, the sound-absorbing material can be attached/detached from individual ones of the panels 103 via hook-and-loop fasteners, magnets, flanges, and/or other attachment mechanisms. Detachability of the sound-absorbing material can allow for reuse of the sound-absorbing material when new and/or replacement appliance hubs are installed. Detachability of the sound-absorbing material can also allow for quick and easy modification to the look of the appliance hub 100. For example, different-colored, textured, and/or shaped sound-absorbing material portions can be swapped out for each other to provide a desired look for the appliance hub 100. In some embodiments, the sound-absorbing material is connected to individual ones of the panels 103 such that a gap remains between the sound-absorbing material and a bottom surface of the panel 103. Maintaining a gap between the sound-absorbing material and the panels 103 for at least a portion of the sound-absorbing material can enhance the noise reduction provided by the sound-absorbing material. Specifically, sound waves can deflect between the sound-absorbing material and the panels 103, thereby increasing the sound-absorption effected by the sound-absorbing material. Individual ones of the panels 103 can have a top surface facing the upper structure or bottom of the deck of the enclosure, and the bottom surface facing the floor of the enclosure.

In some embodiments, individual ones of the panels 103 can include one or more functional elements or components, such as one or more lighting elements 114 and/or one or more devices 116 (individually identified as a first device 116*a* and a second device 116*b* in FIG. 1A). In the illustrated embodiment, for example, the first panel 108*a* and the second panel 108*b* each include one or more of the lighting elements 114. The lighting elements 114 can include, for example, one or more light-emitting diodes ("LEDs"), incandescent sockets and bulbs, halogen sockets and bulbs, fluorescent sockets and bulbs, smart bulbs, uplights (e.g., oriented toward an upper portion of an enclosure), downlights (e.g., oriented toward a lower portion of an enclosure), linear lights, recessed lights, pendant fixture lights, low-profile lights, color-tunable lights, a combination thereof, and/or another type of lighting element. In some embodiments, the lighting elements 114 are retractable (e.g., can hang downward as pendant lights and be retracted back toward the panels 103). In some embodiments, one or more of the lighting elements 114 can include both direct and indirect lighting elements. The direct lighting elements can be oriented toward a floor of an enclosure, and the indirect lighting elements can be oriented toward a ceiling of the enclosure, e.g., to provide ambient light and/or reflect light off the ceiling toward the floor. Additionally, or alternatively, individual ones of the devices 116 can be mounted onto and/or into individual ones of the panels 103. In the illustrated embodiment, the upper panel 112*a* includes the first device 116*a* and the middle panel 112*b* includes the second device 116*b*. In other embodiments, individual ones of the panels 103 can include more or fewer devices 116, such as at least two, three, four, or more devices. The devices 116 can include one or more sensors (e.g., light sensors, occupancy sensors, motion sensors, audio sensors, indoor air quality ("IAQ") sensors, smoke detectors, air flow sensors, temperature sensors, fire alarms, etc.), fire suppression devices (e.g., fire sprinklers), climate control devices (e.g., HVAC devices, air conditioning devices, radiant heating units/panels, diffusers, variable refrigerant flow systems, chilled beams, etc.), communication devices (e.g., wireless communication devices, Wi-Fi units, Bluetooth radios, cell DAS, speakers, microphones, displays), sound dampening components, any other devices described herein, and/or other suitable devices. The functionality of any two or more of the devices may be combined into a single physical device. In these and other embodiments, one or more of the panels 103 (e.g., the lower panel 112*c*, the third panel 110*a*, and/or the fourth panel 110*b*) do not include any lighting elements 114 and/or devices 116.

The arrangement and/or inclusion/exclusion of the lighting elements 114 and/or the devices 116 onto and/or within individual ones of the panels 103 can be customized for the desired installation (e.g., classrooms, offices (private or open), conference rooms, etc.). In at least some embodiments, for example, the arrangement of the lighting elements 114 and/or the devices 116 can be mirrored about the first panel assembly 102 and/or a longitudinal axis X of the appliance hub 100. In the embodiment illustrated in FIG. 1A, the lighting elements 114 are located in the first panel 108*a* and the second panel 108*b*, e.g., the left and right outermost panels of the appliance hub 100, respectively. Additionally or alternatively, one or more lighting elements 114 can be positioned in other panels 103, such as one or more of the central three panels 112*a-c* in the first panel assembly 102. In these and other embodiments, one or more of the devices 116 can be located on and/or within individual ones of the panels 103. In further embodiments, the appliance hub 100 does not include lighting elements 114 and/or devices 116. Accordingly, and as explained in further detail below, the configuration of the appliance hub 100 can be modular such that the panels 103, and/or the lighting elements 114 and/or the devices 116 thereof, can be interchangeable, replaceable, and/or otherwise positioned relative to each other in many different arrangements and/or patterns.

In some embodiments, two or more of the panel assemblies 101 can have a same configuration and/or arrangement. For example, in the illustrated embodiment the second panel assembly 104*a* and the third panel assembly 104*b* have a same width, are mirrors of each other about a longitudinal axis X of the appliance hub 100, and/or include a same number and/or type of lighting elements 114. Additionally, or alternatively, the fourth panel assembly 106*a* and the fifth panel assembly 106*b* can have a same width and are mirrors of each other about the longitudinal axis X.

Figure 1B:
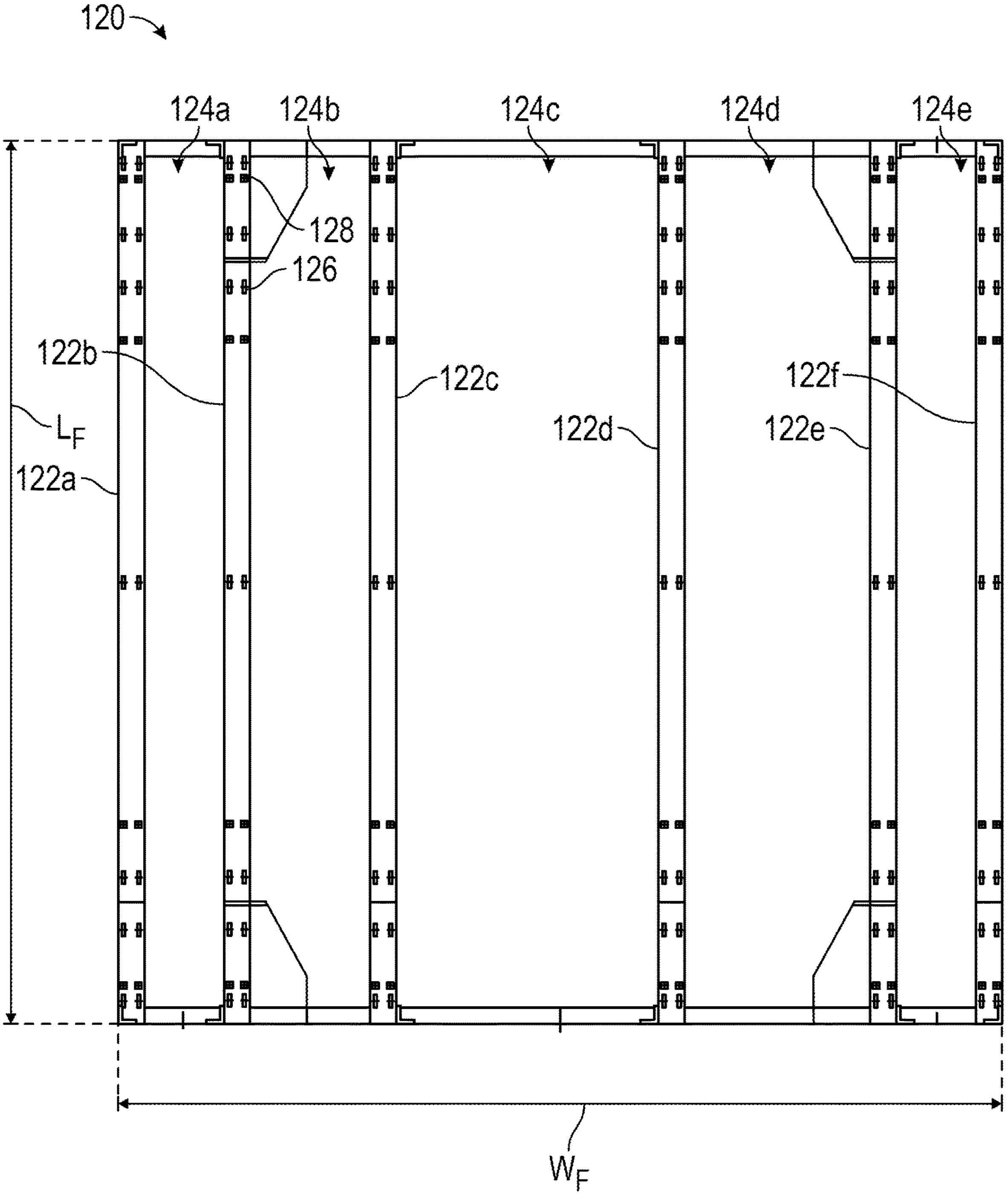
FIG. 1B is a top view of a frame assembly for an appliance hub, such as the appliance hub of FIG. 1A, and configured in accordance with embodiments of the present technology.

FIG. 1B is a top view of a support structure or frame assembly 120 ("frame 120") for an appliance hub, such as the appliance hub 100 of FIG. 1A, and configured in accordance with embodiments of the present technology. The frame 120 can be connected to a ceiling or other mounting point in a structure using, for example, threaded rods connected to gusset plates on the frame. The panels 103, lighting elements 114, and/or the devices 116 of the appliance hub 100 of FIG. 1A can be mounted to and/or carried by the frame 120. Accordingly, the frame 120 can provide a base structure onto which various numbers, arrangements, and/or configurations of the panels 103 can be mounted. In some embodiments, the frame 120 can be configured to allow one or more objects, such as mounting devices, circuitry, power lines, and/or the backsides of the lighting elements 114 and/or the devices 116, to be mounted to the frame 120 opposite the panels 103 so as to be concealed from view. For example, when viewed from below, objects mounted to the frame 120 opposite the panels 103 can be at least partially or fully visually obscured.

The frame 120 can be constructed from a metal (e.g., cold-formed steel), polymer, wood (e.g., engineering lumber), and/or other suitable materials or combinations of materials, and can include one or more support portions or struts 122 (individually identified as a first strut 122*a*, a second strut 122*b*, a third strut 122*c*, a fourth strut 122*d*, a fifth strut 122*e*, and a sixth strut 122*f* in FIG. 1B). Although the frame 120 includes six struts 122 in the embodiment illustrated in FIG. 1B, in other embodiments the frame 120 can include more or fewer struts 122, such as at least two, three, four, five, seven, eight, or more struts.

The frame 120 and further include one or more gaps or spaces 124 between individual ones of the struts (individually identified as a first space 124*a* defined by the first and second struts 122*a-b*, a second space 124*b* defined by the second and third structs 122*b-c*, a third space 124*c* defined by the third and fourth struts 122*c-d*, a fourth space 124*d* defined by the fourth and fifth struts 122*d-e*, and a fifth space 124*e* defined by the fifth and sixth struts 122*e-f*). Although the frame 120 includes five spaces 124 in the embodiment illustrated in FIG. 1B, in other embodiments the frame 120 can include more or fewer spaces, such as at least one, two, three, four, six, seven, or more spaces.

Figure 1C:
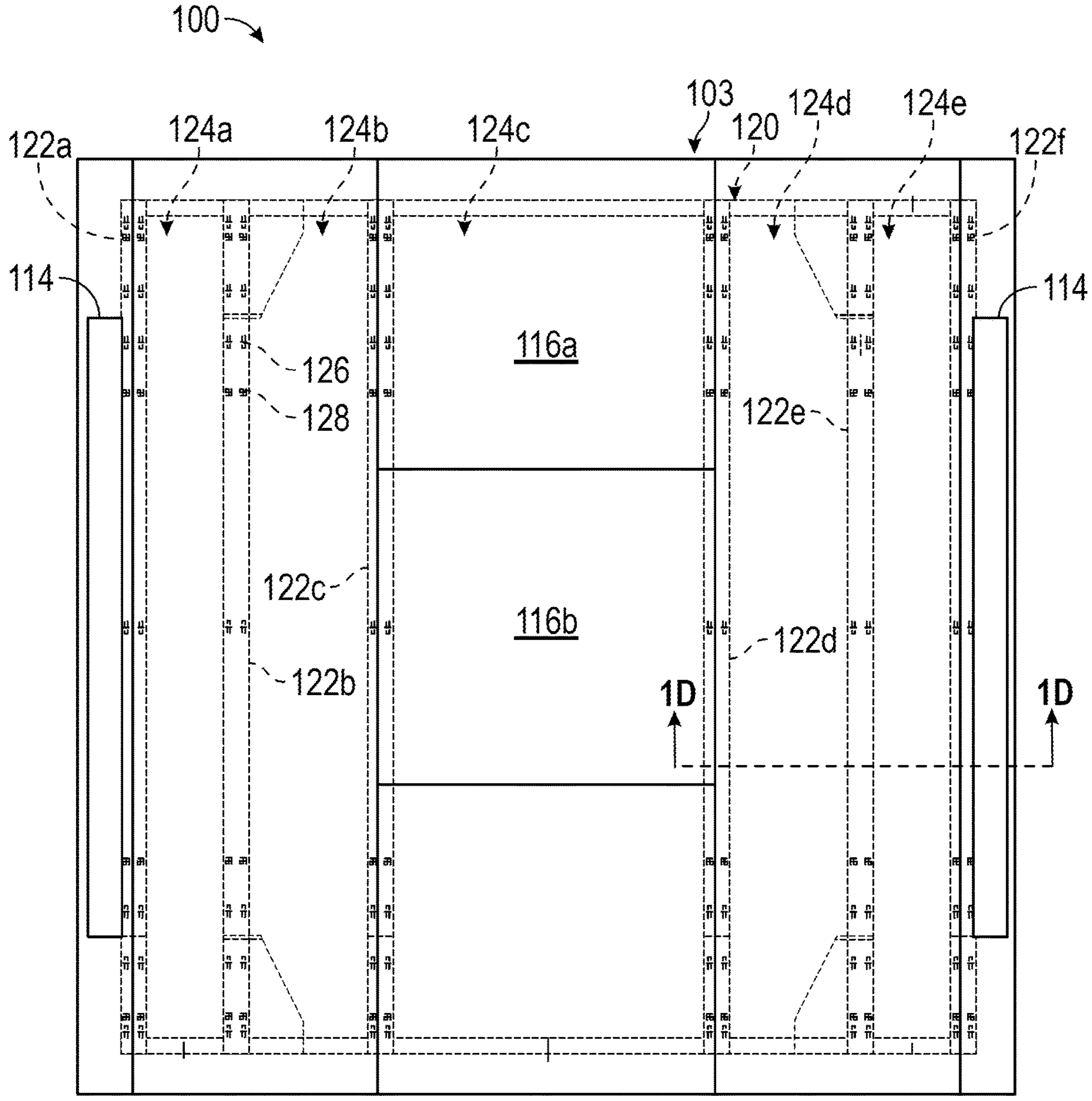
FIG. 1C is a partially schematic front view of the appliance hub of FIG. 1A including the frame assembly of FIG. 1B.

FIG. 1C is a partially schematic front view of the appliance hub 100 and the frame 120. Referring to FIGS. 1B and 1C together, the frame 120 can include one or more first attachment points 126 (e.g., laser-cut provisions or other attachment structures) configured to facilitate mounting the panels 103 (FIG. 1A) to the frame 120 in various arrangements, and/or one or more second attachment points 128 configured to facilitate the relative positioning and/or alignment the panels 103 relative to one another and/or the frame, and/or to the restrain the panels 103 from movement during a seismic event. In some embodiments, one or more of the first attachment points 126 are configured to receive a torsion-spring system, for example, that enables one person to install and/or remove individual ones of the panels in the field. In some embodiments, one or more of the second attachment points 128 are configured to receive a quarter-turn fastener. Quarter-turn fasteners can be configured to lock the panels in place and serve as positive attachment between the panels and frame 120. In other embodiments, the first attachment points 126 and/or the second attachment points 128 can be configured to receive other attachment components, including any of the attachment components described in detail with reference to FIGS. 3A-3E.

When the panels 103 are coupled to the frame 120, the lighting elements 114, the devices 116, and/or other aspects of the appliance hub 100 (FIG. 1A) can be positioned at least partially within and/or exterior to individual ones of the spaces 124, such that individual ones of the spaces 124 can be empty or at least partially filled/occupied depending on the configuration and/or arrangement of the lighting elements 114, devices 116, and/or other aspects of the appliance hub 100. A length $L_F$ and/or a width $W_F$ of the frame 120 (FIG. 1B) and/or the components thereof (e.g., the struts 122 and/or the spaces 124) can be selected based at least partially on the dimensions of one or more of the configuration and/or arrangement of the panels 103 (FIG. 1A) to be mounted to the frame 120. In at least some embodiments, the length $L_F$ of the frame 120 can be less than the length L of the appliance hub 100 (FIG. 1A), and/or the width $W_F$ of the frame 120 can be less than the width $W_F$ of the appliance hub 100 (FIG. 1A), such that individual ones of the panels 103 (FIG. 1A) can overhang and/or extend beyond the frame 120. In other embodiments, the length $L_F$ of the frame 120 can be equal to or greater than the length L of the appliance hub 100 (FIG. 1A), and/or the width $W_F$ of the frame 120 can equal to or greater than the width $W_F$ of the appliance hub 100 (FIG. 1A), Referring to FIGS. 1A-1C together, the appliance hub 100 can have a modular design configured to permit individual ones of the panels 103 and/or the devices 116 to be detached from the frame 120, such as for maintenance and/or replacement by other (e.g., different) panels and/or devices. In at least some embodiments, for example, the panels 103 can have a modular configuration with at least one device 116 per individual panel 103. To replace or upgrade the appliance hub 100, and/or one or more of the panels 103 and/or panel assemblies 101 thereof, a replacement panel kit can be provided with one or more new lighting elements and/or devices pre-installed. The panel to be replaced can be removed, as described below with reference to FIGS. 4A-5C, the device unplugged, and a new panel can be wired into the appliance hub 100 and installed onto the frame. As such, the appliance hubs 100 of the present technology are expected to be highly flexible and adaptable to the needs of individual users, and configured to allow users to change the arrangement, configuration, and/or functionality of the panels 103 of the appliance hubs 100 over time.

Figure 1D:
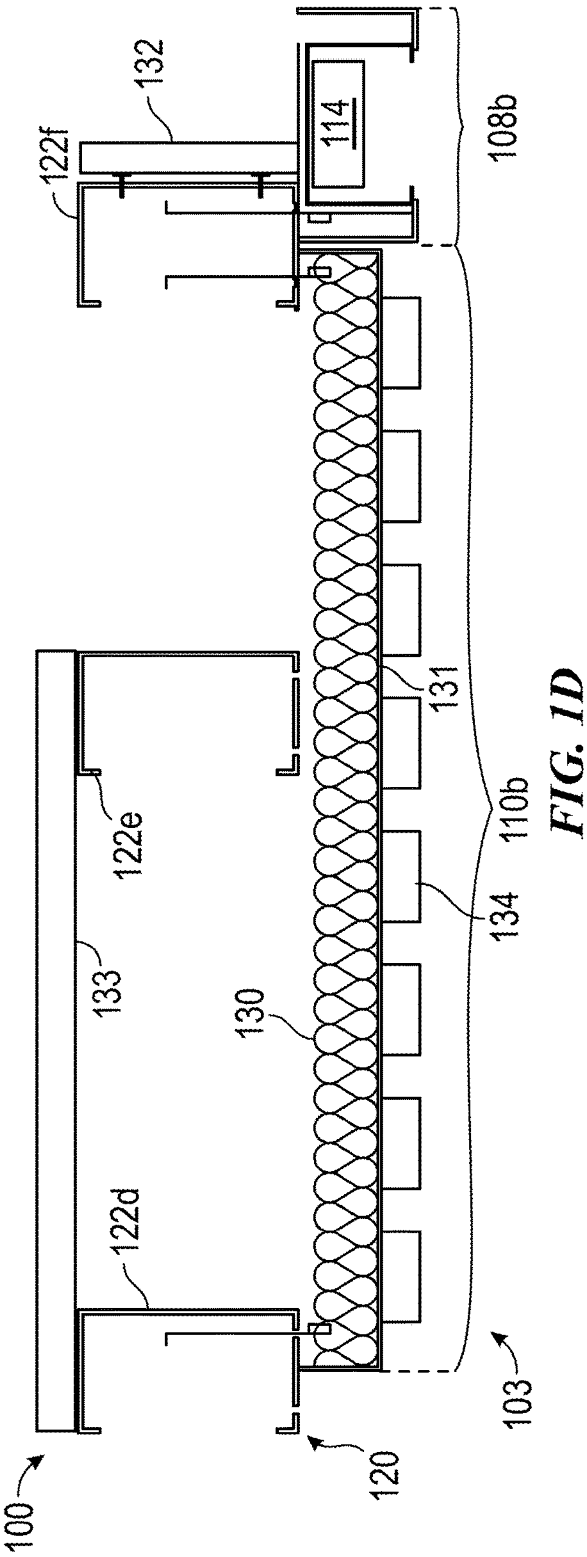
FIG. 1D is a cross-sectional view of the appliance hub of FIG. 1A taken along line 1D-1D in FIG. 1C.

FIG. 1D is a cross-sectional view of the appliance hub 100 taken along line 1D-1D in FIG. 1C. In some embodiment, one or more of the panels 103 can include an acoustic fabric or liner 130, which can also be referred to as a "blanket" or an "acoustic blanket." The acoustic liner 130 can include any suitable sound-dampening material, such as the UltraLiner™ Sound Blanket manufactured by Bonded Logic Inc., headquartered in LaFayette Georgia, the Echo Eliminator™ manufactured by Acoustical Surfaces, Inc., headquartered in Chaska, Minnesota, and/or another suitable acoustic liner. In the illustrated embodiment, the fourth panel 110*b* includes a metal housing or tray 131 (which can also be referred to as a "metal panel") configured to contain the acoustic fabric. Additionally, or alternatively, one or more acoustic panels 132 can coupled to one or more of the struts 122. In the illustrated embodiment, for example, the acoustic panel 132 is coupled to an outward-facing side of the sixth strut 122*f* and positioned perpendicular to the panels 103 and/or above the lighting element 114 (shown schematically). In other embodiments, the appliance hub 100 can include more acoustic panels 132 and/or acoustic panels in other positions. In these and other embodiments, one or more of the panels 103 can include one or more elongated slats or strips of material 134 (e.g., wood, metal, plastic, etc.). In the illustrated embodiment, for example, a plurality of the slats 134 are coupled to the metal tray 131, and each of the slats 134 is spaced apart from the other elongated strips 134. The metal tray 131 can be perforated, such that acoustic energy (e.g., sound) can pass between individual ones of the slats 134 and/or through the perforations in the metal tray 131, e.g., to absorb or attenuate sound within an enclosure. As best seen in FIG. 1D, in some embodiments one or more of the lighting elements 114 can be positioned at least partially within the second panel 108*b*. Optionally, sound adsorption or acoustic material 133 can be coupled to an upper or backside of the frame 120 opposite the panels 103.

Figure 1E:
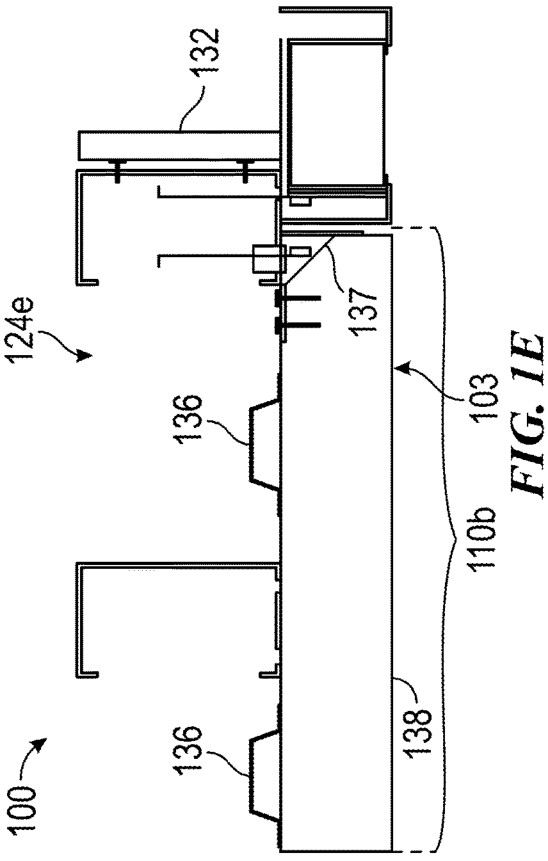
FIGS. 1E-1H are respective a side cross-sectional views of other configurations for the appliance hub of FIG. 1D, each in accordance with embodiments of the present technology.

FIG. 1E is a side cross-sectional view of another configuration of the appliance hub 100, in accordance with embodiments of the present technology. In some embodiments, one or more stiffeners or support channels 136 are coupled to one or more of the panels 103. In the illustrated embodiment, for example, two support channels 136 are coupled to a backside of the fourth panel 110*b*. Individual ones of the support channels 136 can include a double leg resilient channel, or another suitable support channel. In at least some embodiments, the support channels 136 can be configured to reduce or prevent bending and/or deformation of the panels 103, such as when the panels 103 include acoustic material 138. In these and other embodiments, one or more brackets 137 can be coupled individual ones of the panels 103 can configured stiffen or at least partially reduce bending/deformation the associated panel 103. In the illustrated embodiment, for example, the bracket 137 is coupled to an edge of the fourth panel 110*b*. The acoustic material 138 can be included along with and/or in lieu of the acoustic panel 132 described with reference to FIG. 1D.

Figure 1F:
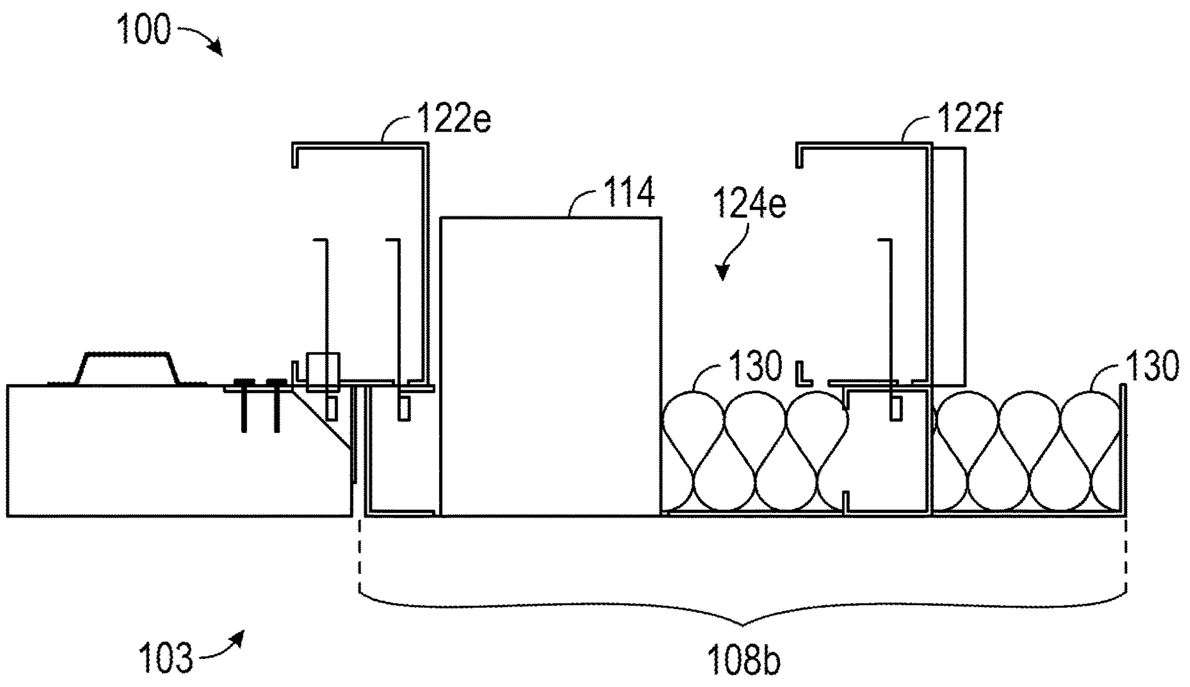

FIG. 1F is a side cross-sectional view of another configuration of the appliance hub 100, in accordance with embodiments of the present technology. In the illustrated embodiment, the lighting element 114 in the second panel 108*b* is positioned in the fifth space 124*e* between the fifth and sixth struts 122*e-f*. The second panel 108*b* further includes the sound-dampening blanket 130 described previously with reference to FIG. 1D, but positioned outwardly from the lighting element 114.

Figure 1G:
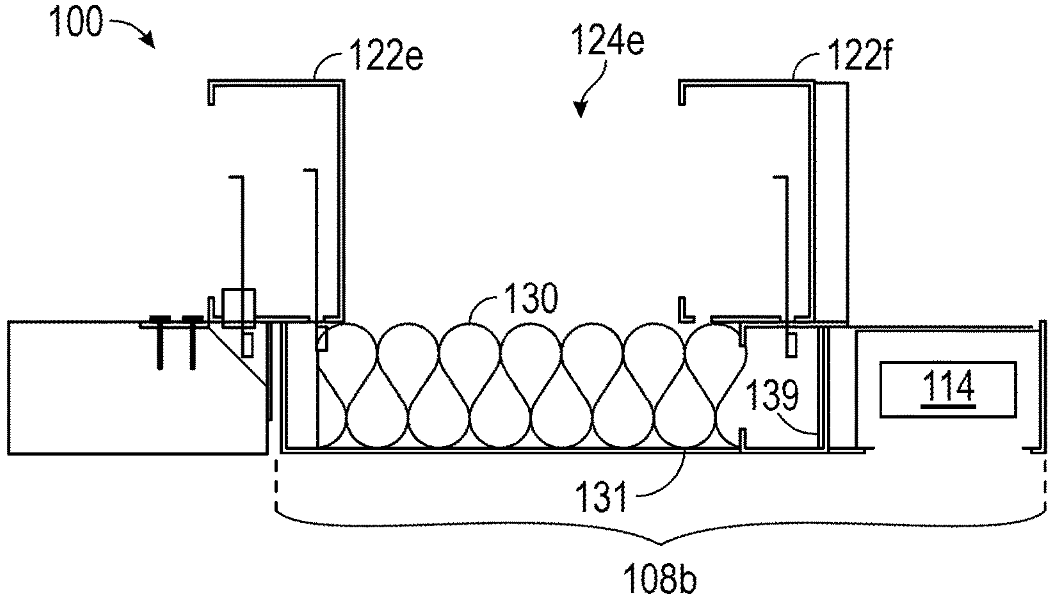

FIG. 1G is a side cross-sectional view of another configuration of the appliance hub 100, in accordance with embodiments of the present technology. In the illustrated embodiment, the third panel assembly 104*b* includes the metal tray 131 with the acoustic liner 130 positioned at least partially in the fifth space 124*e* between the fifth and sixth structs 122*e-f*, and the lighting elements 114 positioned outwardly from the acoustic liner 130. A stiffener panel 139, can be positioned at least partially between the acoustic liner 130 and the lighting element 114. The stiffener panel 139 can include a rigid metal plate, or another suitable stiffener panel.

Figure 1H:
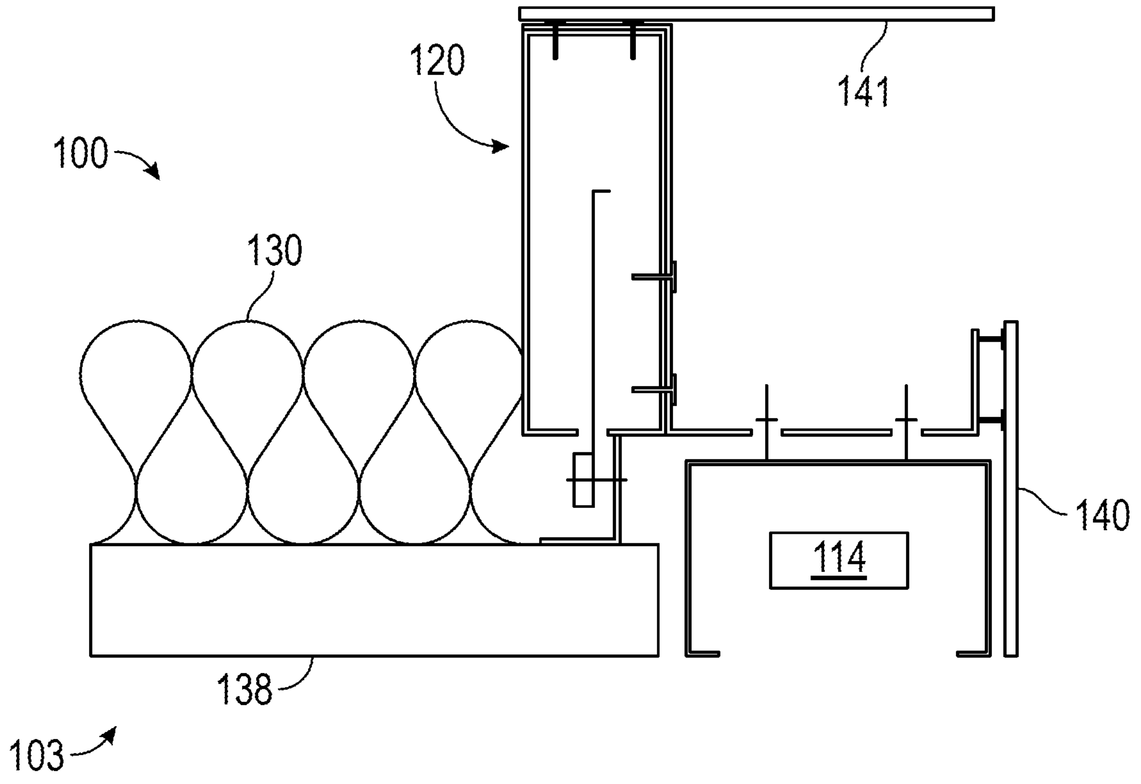

FIG. 1H is a side cross-sectional view of another configuration of the appliance hub 100, in accordance with embodiments of the present technology. In the illustrated embodiment, one or more of the panels 103 include the acoustic material 138 and the acoustic liner 130 as a backing. Additionally, or alternatively, the appliance hub 100 can include one or more trim panels 140, which can be coupled to a circumference or periphery of the frame 120 to extend around all or a portion of the periphery of the frame 120. In the illustrated embodiment, for example, the trim panel 140 is positioned outwardly from the lighting element 114 (shown schematically). Additionally, or alternatively, one or more trim panels 141 can be positioned on a top side of the frame 120, opposite the panels 103. The trim panels 141 can be at least generally similar or identical in structure and/or function to the trim panels 140, and in some embodiments can contact one another and/or comprise a single-piece component. In at least some embodiments, one or more of the trim panels 140, 141 are acoustic panels configured to attenuate or dampen sound.

Figure 2A:
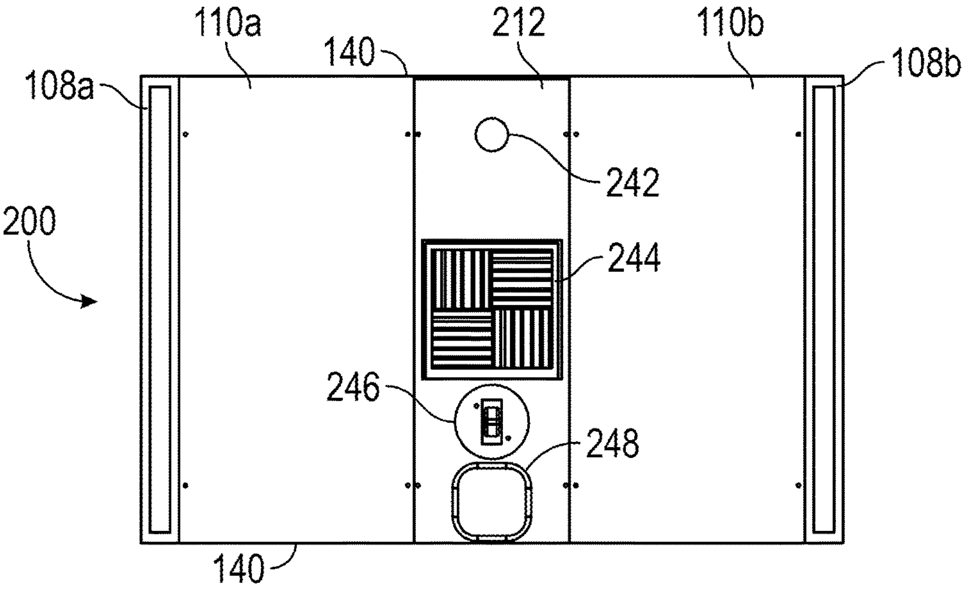
FIGS. 2A-2C are front, back perspective, and exploded views, respectively, of an appliance hub configured in accordance with embodiments of the present technology.
Figure 2B:
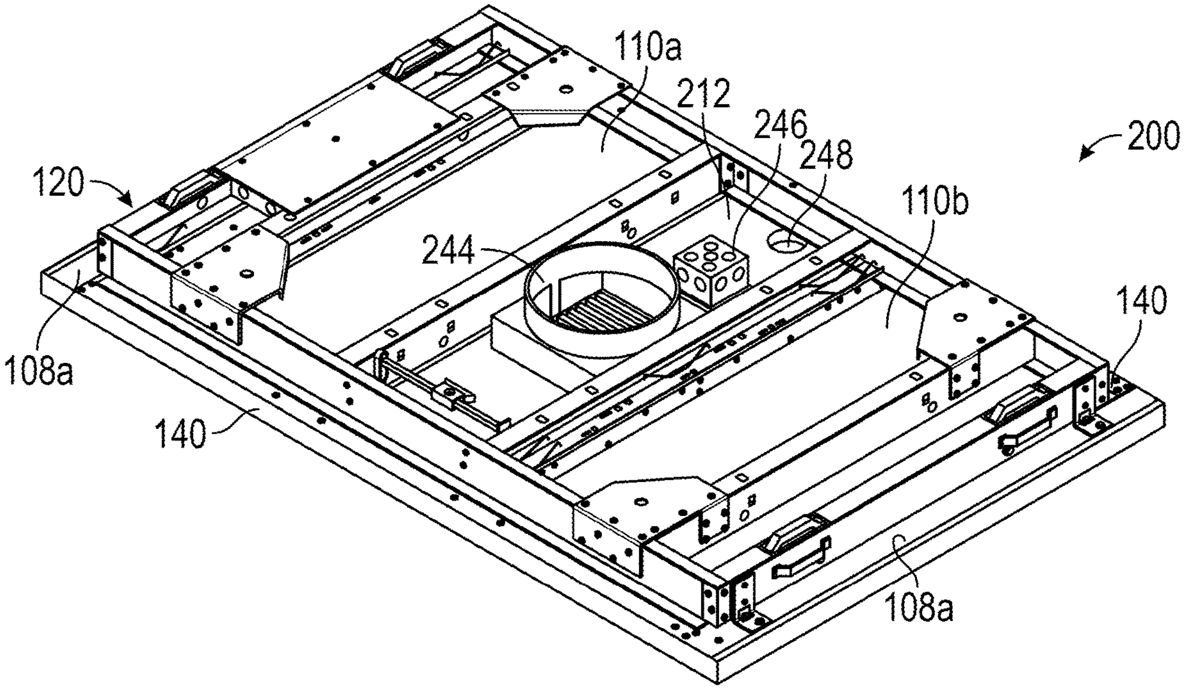
Figure 2C:
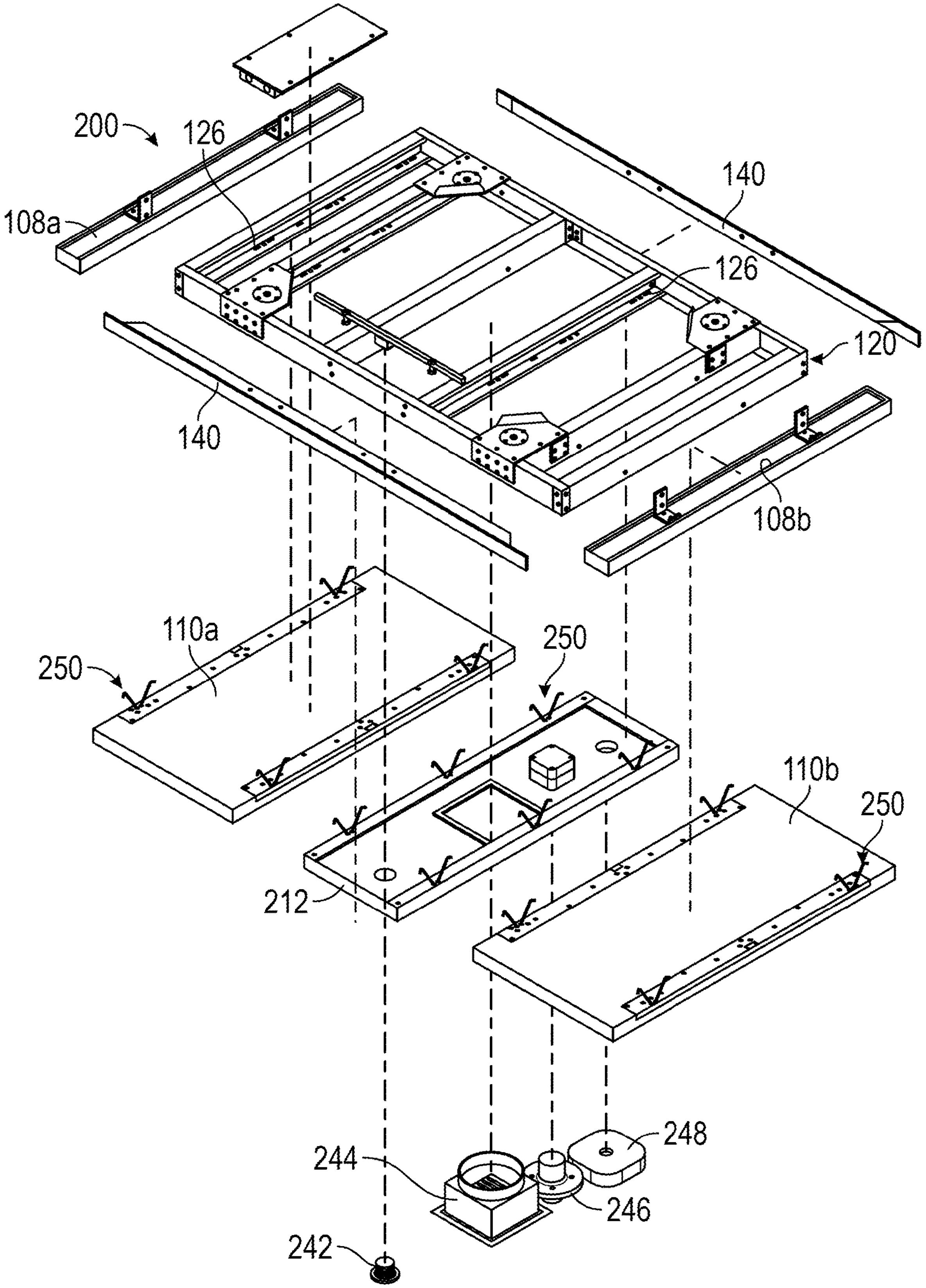

FIGS. 2A-2C are front, back perspective, and exploded views, respectively, of an appliance hub 200 configured in accordance with embodiments of the present technology. The appliance hub 200 can include at least some aspects that are at least generally similar or identical in structure and/or function to the appliance hub 100 of FIGS. 1A-1H. In the illustrated embodiment, for example, the appliance hub includes the first panel 108*a*, the second panel 108*b*, the third panel 110*a*, the fourth panel 110*b*, and one or more of the trim panels 140. In contrast with the appliance hub 100, however, the appliance hub 200 includes a single central panel 212. In the illustrated embodiment, multiple devices are included on and/or within the central panel 212, including a fire sprinkler cover 242, a diffuser 244, a fire alarm 246, and a Wi-Fi access point and/or router 248. In other embodiments, the central panel 212 can include these and/or other devices, including any other devices described herein. In the illustrated embodiment, the appliance hub 200 includes two trim panels 140, positioned on opposing sides of the appliance hub 200. In other embodiments the appliance hub 200 can include more or fewer trim panels 140, individual ones of which can be positioned on any side of the appliance hub 200.

As best seen in FIG. 2C, the third panel 110*a*, the fourth panel 110*b*, and the central panel 212 can include one or more attachment components 250, individual ones of which can be configured to be received within the corresponding attachment points 126 of the frame. Accordingly, each of the third panel 110*a*, the fourth panel 110*b*, and the central panel 212 can be releasably mounted to the frame 120, as described previously herein. In the illustrated embodiment, the first panel 108*a* and the second panel 108*b* are configured to be fixedly mounted to respective sides of the frame 120, for example, using brackets, screws, etc. In other embodiments, one or both of the first panel 108*a* and the second panel 108*b* can be configured to be releasably mounted to the frame 120.

Figure 3A:
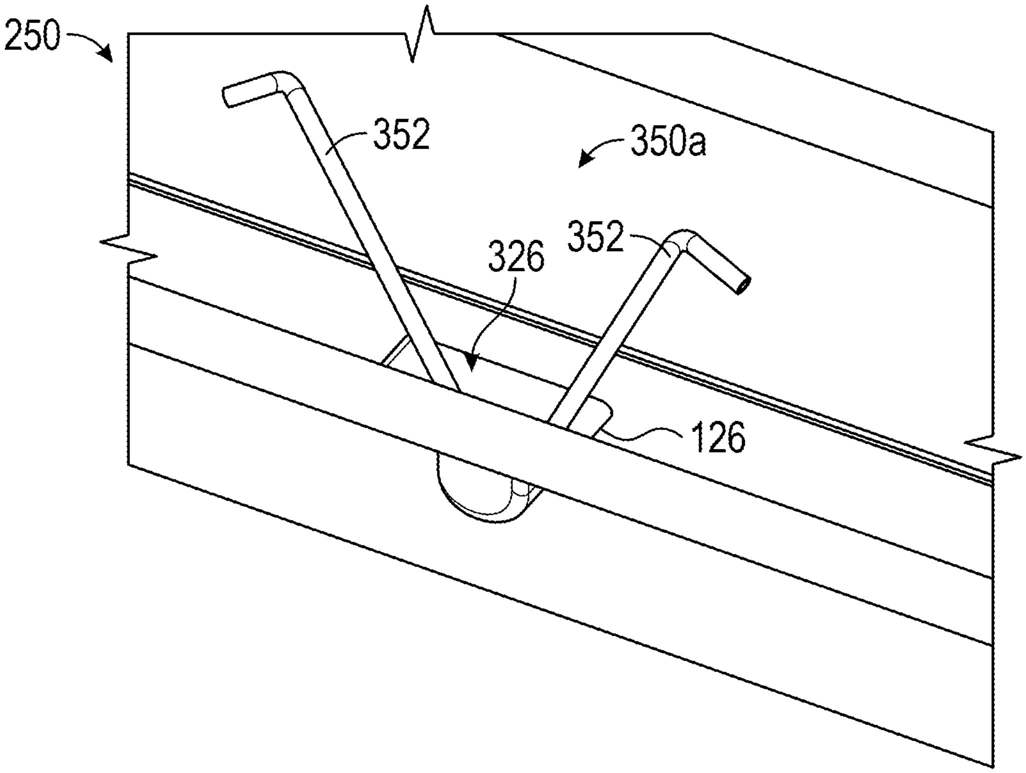
FIGS. 3A-3E are perspective views of attachment components for use with appliance hubs in accordance with embodiments of the present technology.
Figure 3B:
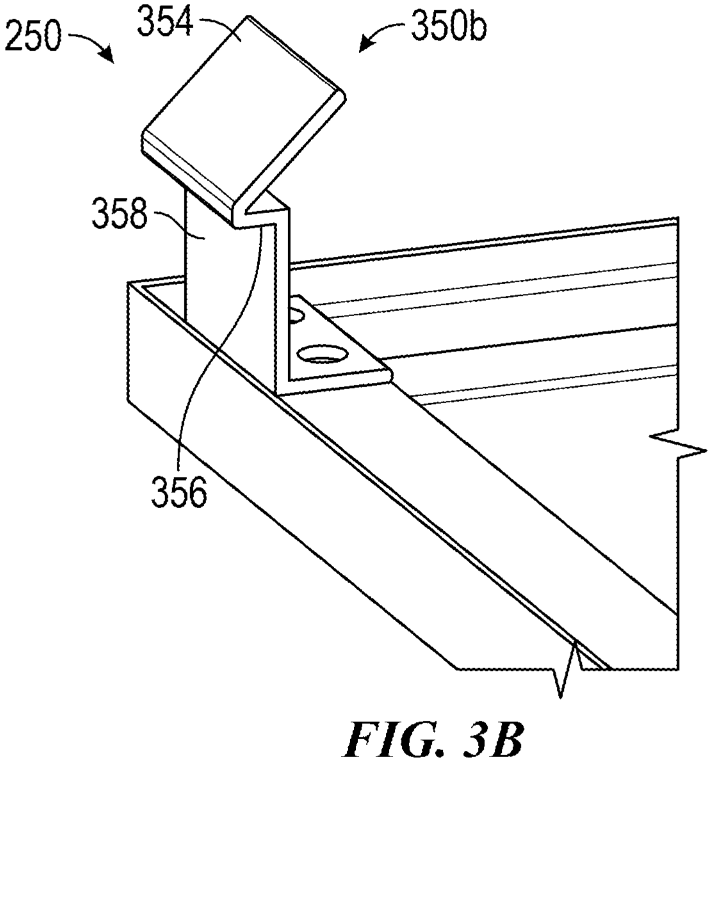
Figure 3C:
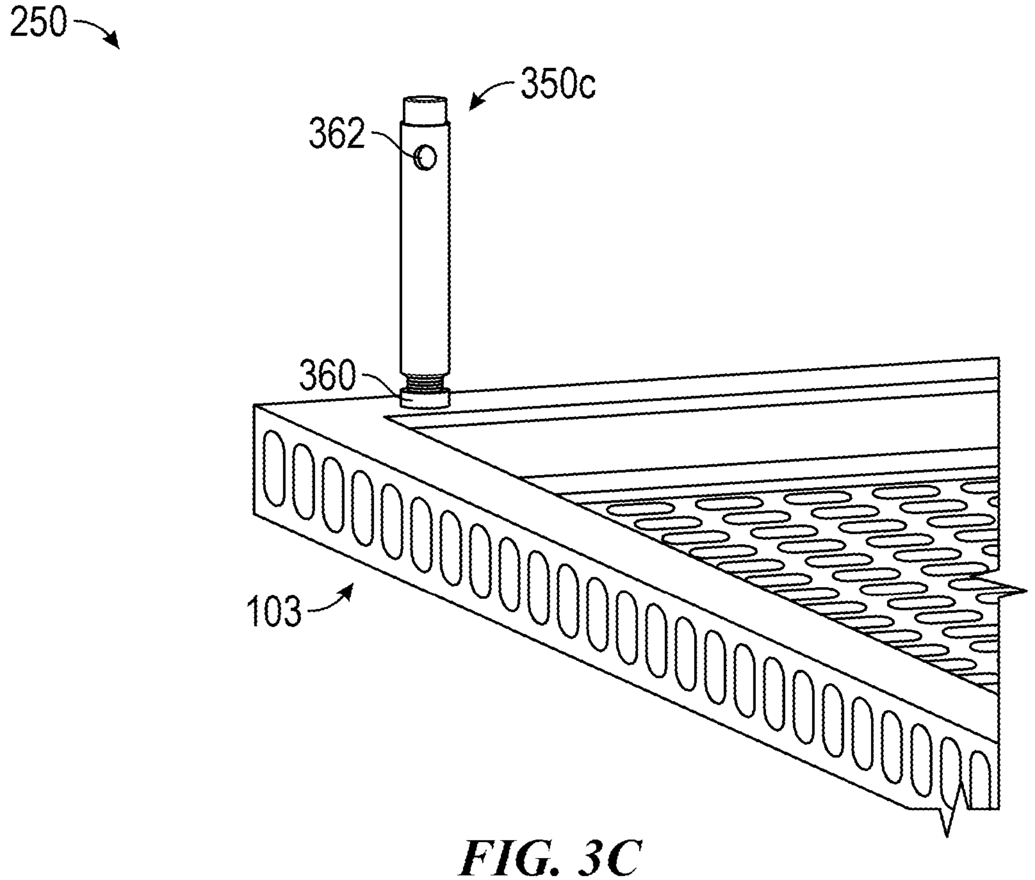
Figure 3D:
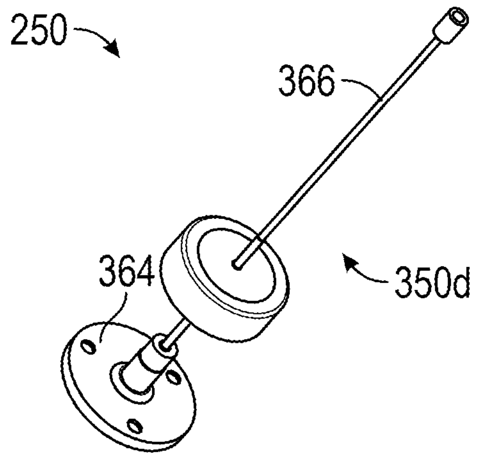
Figure 3E:
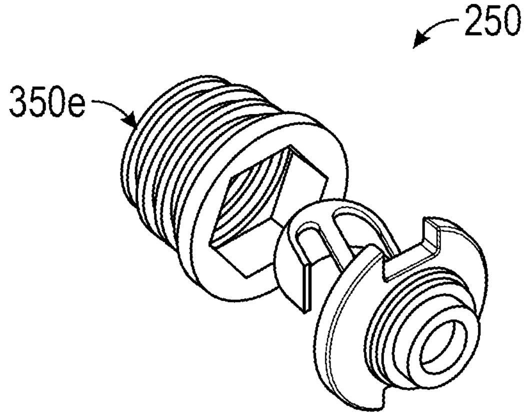

FIGS. 3A-3E are perspective views of attachment components 250 for use with appliance hubs in accordance with embodiments of the present technology. Referring to FIG. 3A, the attachment components 250 can include one or more torsion springs 350*a* including outwardly-biased spring arms 352 configured to be received within a correspondingly sized slot 326 at an attachment point 126. Referring to FIG. 3B, the attachment components 250 can include one or more spring clips 350*b* including an insertion portion 354, a catch portion 356, and a flex portion. During coupling, the insertion portion 354 can be configured to cause bending/deflection of the flex portion 358 in a first direction, such as until the catch portion 356 engages an attachment point and allows the flex portion 358 to bend a second direction opposite the first direction and return to an unbent state. Referring to FIG. 3C, the attachment components can include one or more quick-release pins, such as any quick-release pin manufactured McMaster-Carr Supply Co., headquartered in Elmhurst, Illinois. In at least some embodiments, the quick-release pin 350*c* can include a threaded portion 360 configured to be threadably received by at least one of the panels 103 and a spring-loaded pin 362 configured to be received by an attachment point. Referring to FIG. 3D, the attachment component 250 can include a cable attachment system 350*d*, such as the PS-S150E manufactured by Fastmount®, headquartered in Silverdale, Auckland, NZ. The cable attachment system 350*d* can include a panel mount 364 and cable 366. After installation, the cable 366 can be unspooled and/or retracted to raise or lower the panel mount 364 and adjust the position of any panel attached thereof. Referring to FIG. 3E, the attachment component 250 can include a male/female self-tapping clip system 350*e*, such as a PC-01 clip set manufactured by Fastmount®.

Figure 4A:
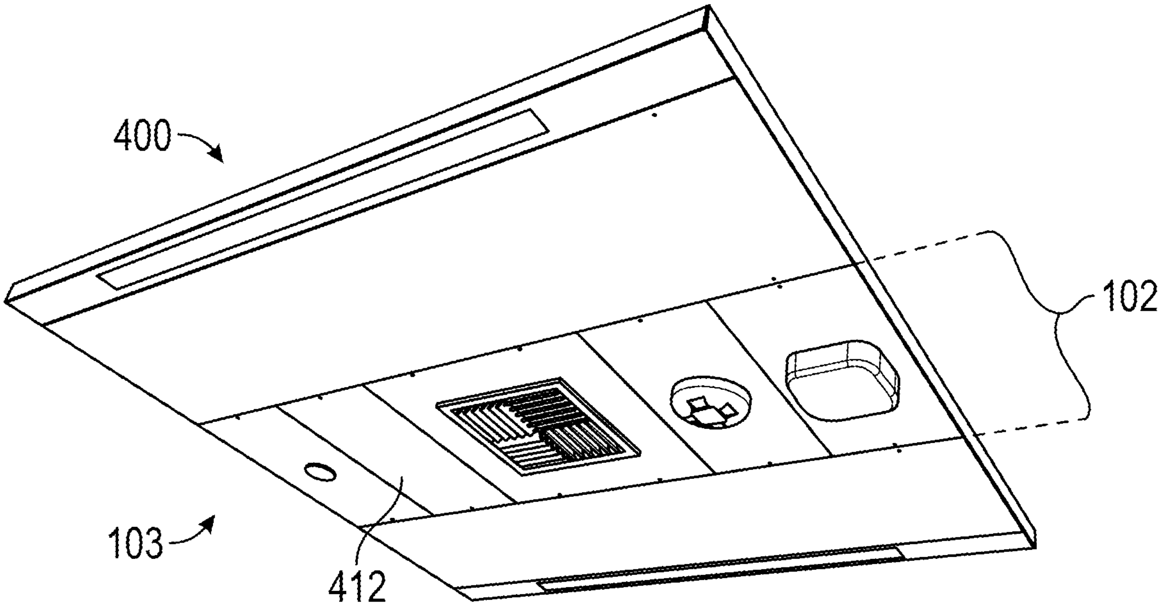
FIGS. 4A and 4B are front perspective views of an appliance hub in an operation state and an accessibility state, respectively, in accordance with embodiments of the present technology.
Figure 4B:
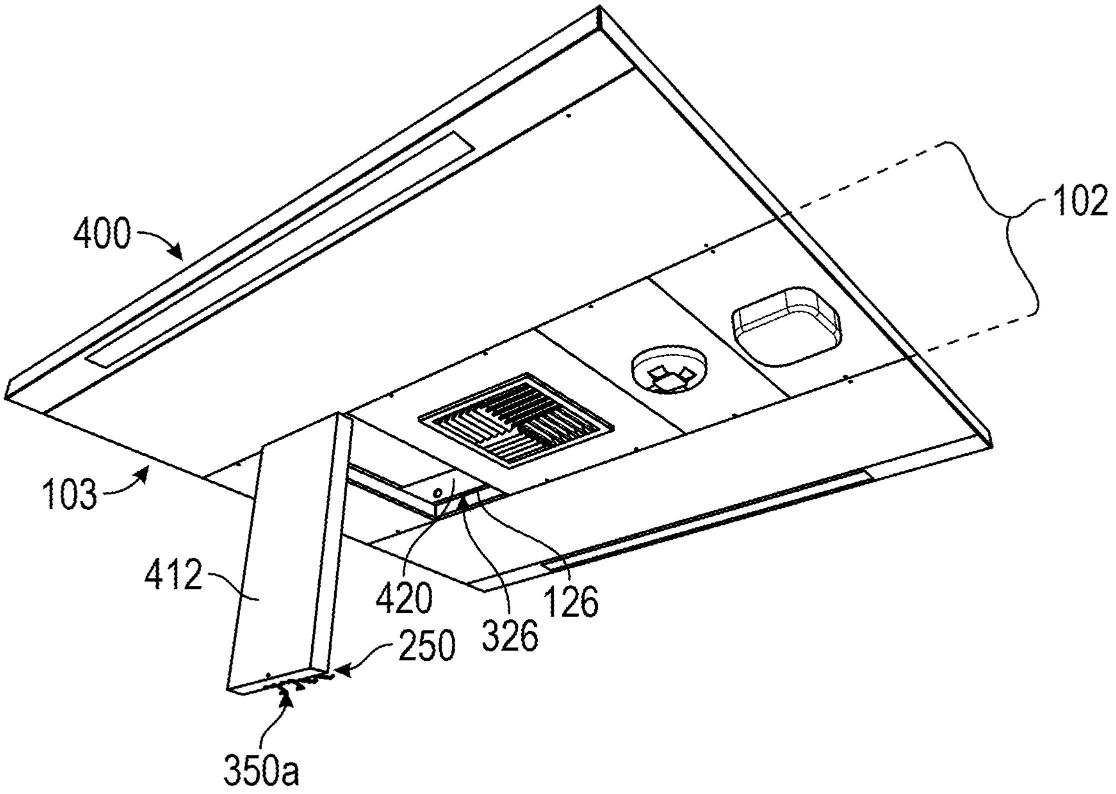

FIGS. 4A and 4B are front perspective views of an appliance hub 400 in an operation state and an accessibility state, respectively, in accordance with embodiments of the present technology. At least some aspects of the appliance hub 400 can be at least generally similar or identical in structure and/or function to one or more of the other appliance hubs described herein. For example, the appliance hub 400 includes the first panel assembly 102, the attachment points 126, and the attachment components 250. Referring to FIG. 4A, one or more of the panels 103 in the first panel assembly 102, such as panel 412, can be at least partially removed from the appliance hub 400. For example, referring to FIG. 4B, the panel 412 can include one or more attachment components 250 configured to be received by corresponding attachment points 126 in the frame 420. In the illustrated embodiment the attachment components 250 include the torsion springs 350*a* and the attachment points 126 include the slots 326. In these and other embodiments the attachment components 250 and/or attachment points 126 can have other configurations. As shown in FIG. 4B, the panel 412 is hanging vertically from the frame via two connected torsion springs (not visible in FIG. 4B). The connected torsion spring can be disconnected from the frame 420 to allow for removal of the panel 412 from the frame 120, or the torsion springs 350*a* can be received within the slots 326 to couple the panel 412 to the frame 420. When coupling the panel 412 to the frame 420, after positioning the torsion springs 350*a* within the corresponding slots 326 the panel 412 can be gently pressed (e.g., vertically) into place, such that the torsion springs 350*a* can into place within the slots 326 and hold the panel 412 flush relative to one or more of the other panels 103 to the underside of the frame 420.

Figure 5A:
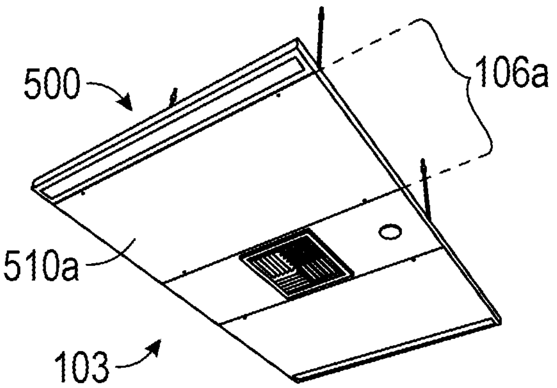
FIGS. 5A-5C are perspective views of an appliance hub with a panel in various positions in accordance with embodiments of the present technology.
Figure 5B:
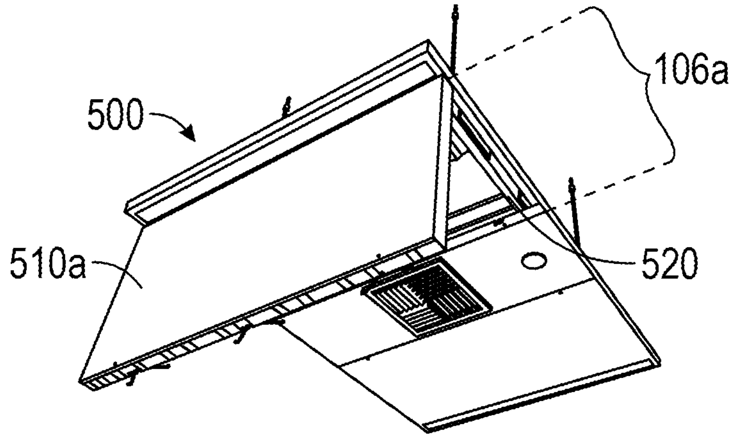
Figure 5C:
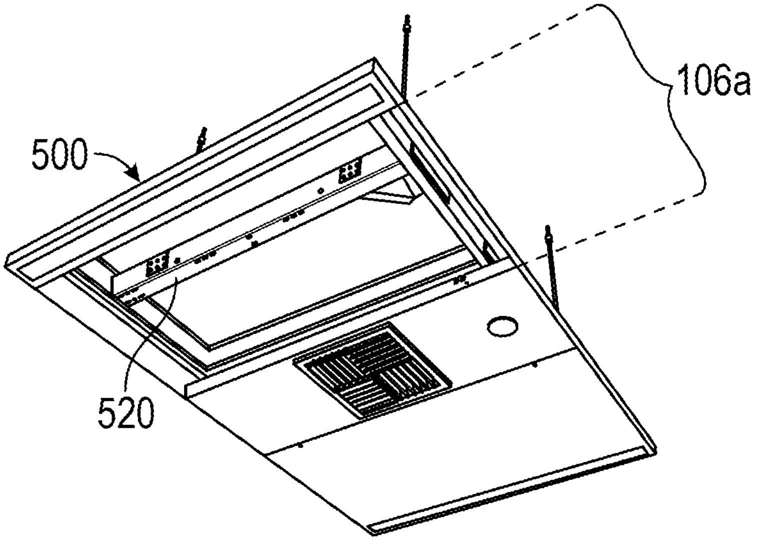

FIGS. 5A-5C are perspective views of an appliance hub 500 with a panel in various positions, in accordance with embodiments of the present technology. At least some aspects of the appliance hub 500 can be at least generally similar or identical instruction in structure and/or function to one or more of the other appliance hubs described herein. For example, the appliance hub 500 includes the fourth panel assembly 106*a*. The fourth panel assembly 106*a* can include a panel 510*a* that can be removed from the appliance hub 500, such as described previously with reference to FIGS. 4A and 4B. One side of the panel 510*a* can be detached from the frame 520 such that the panel 510*a* hangs downwardly, suspended from the frame 520, as shown in FIG. 5B. To fully detach the panel 510*a* from the frame 520, as shown in FIG. 5C, the other side of the panel 510*a* can be decoupled from the frame 520. Once removed, the panel 510*a* can be serviced and/or replaced with another panel having a same or different configuration.

Figure 6A:
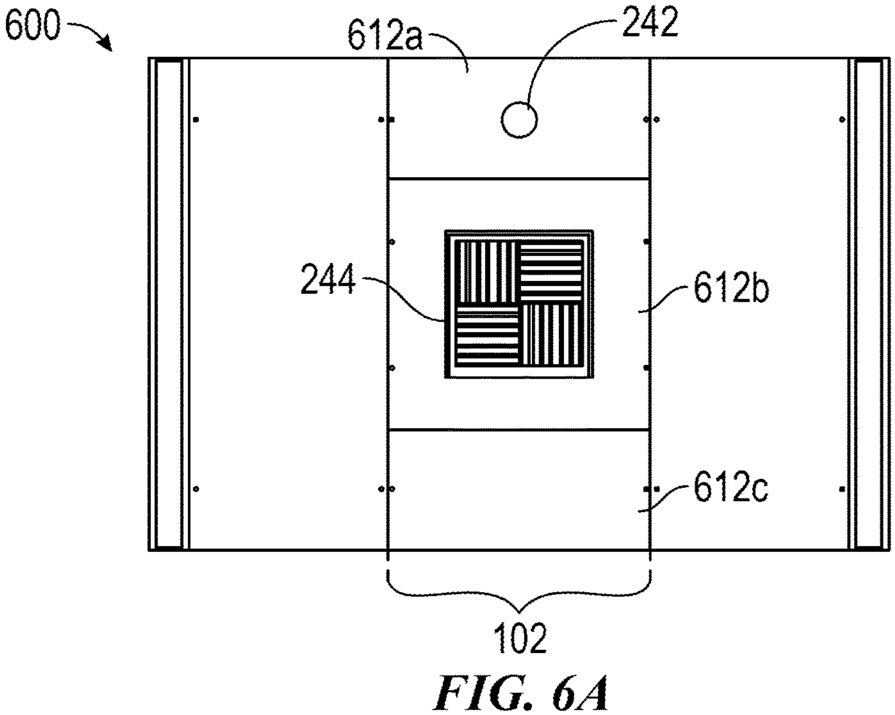
FIGS. 6A-6C are partial front, perspective front, and side views, respectively, of an appliance hub configured in accordance with embodiments of the present technology.
Figure 6B:
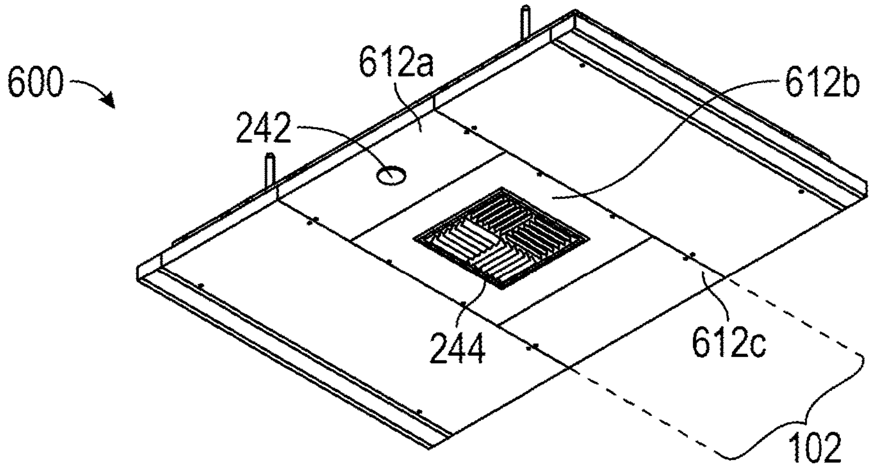
Figure 6C:
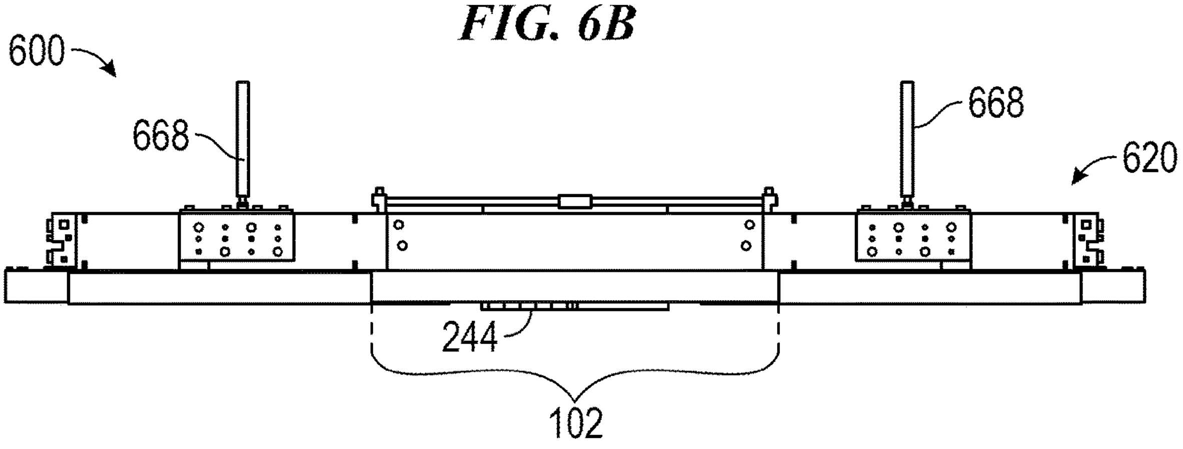

FIGS. 6A-6C are partial front, perspective front, and side views, respectively, of an appliance hub 600 configured in accordance with embodiments of the present technology. At least some aspects of the appliance hub 600 can be at least generally similar or identical in structure and/or function to one or more of the appliance hubs described previously herein. For example, in the illustrated embodiment the appliance hub 600 includes the first panel assembly 102, and the first panel assembly 102 includes the fire sprinkler cover 242 and the diffuser 244. The fire sprinkler cover 242 is mounted to a first panel 612*a* in the first panel assembly 102 and the diffuser 244 is mounted to a second panel 612*b* in the first panel assembly 102. The first panel assembly 102 further includes a blank panel 612*c* which, in at least some embodiments, can be removed and replaced with one or more other panels, each configured to carry one or more devices, lighting elements, etc. Additionally, or alternatively, the first panel 612*a* and/or the second panel 612*b* can be configured to be removable and/or replaced with one or more other panels. As best seen in FIG. 6C, the appliance hub 600 can further include one or more enclosure mounting components 668 coupled to a frame 620 of the appliance hub 600 and configured to couple/mount the appliance hub 600 to one or more surfaces (e.g., walls, the ceiling etc.) within an enclosure.

Figure 7:
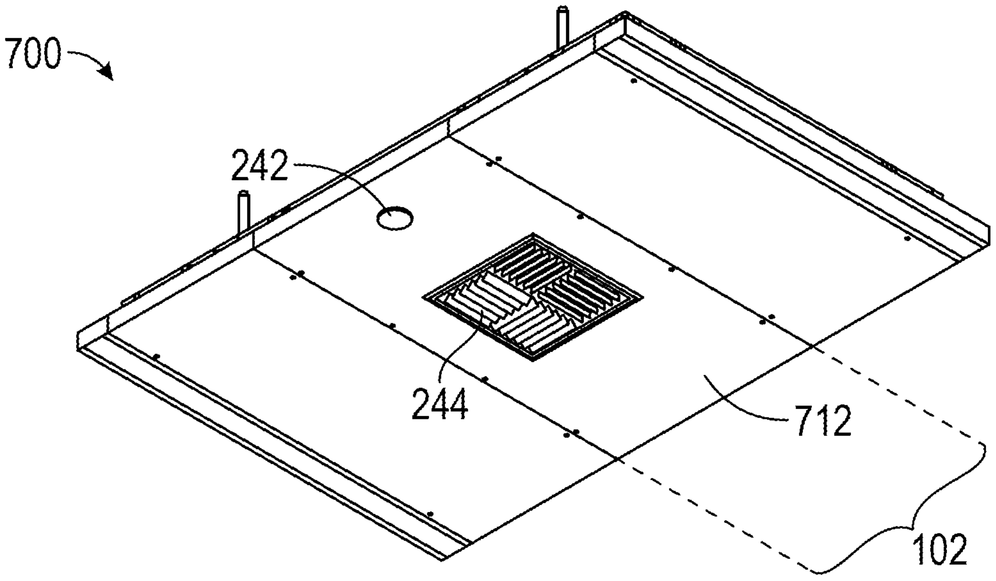
FIG. 7 is a perspective front view of an appliance hub configured in accordance with embodiments of the present technology.

FIG. 7 is a perspective view of an appliance hub 700 configured in accordance with embodiments of the present technology. At least some aspects of the appliance hub 700 can be at least generally similar or identical in structure and/or function to one or more of the appliance hubs described previously herein. For example, in the illustrated embodiment the appliance hub 700 includes the first panel assembly 102, and the first panel assembly 102 includes the fire sprinkler cover 242 and the diffuser 244, such as described previously with reference to the appliance hub 600 of FIGS. 6A-6C. However, in contrast to the appliance hub 600 of FIGS. 6A-6C, the appliance hub 700 includes both the fire sprinkler cover 242 and the diffuser 244 in a single panel 712 in the first panel assembly 102. In at least some embodiments, the appliance hub 700 can be configured such that the single panel 712 can be removed and replaced with one or more other panels.

Figure 8:
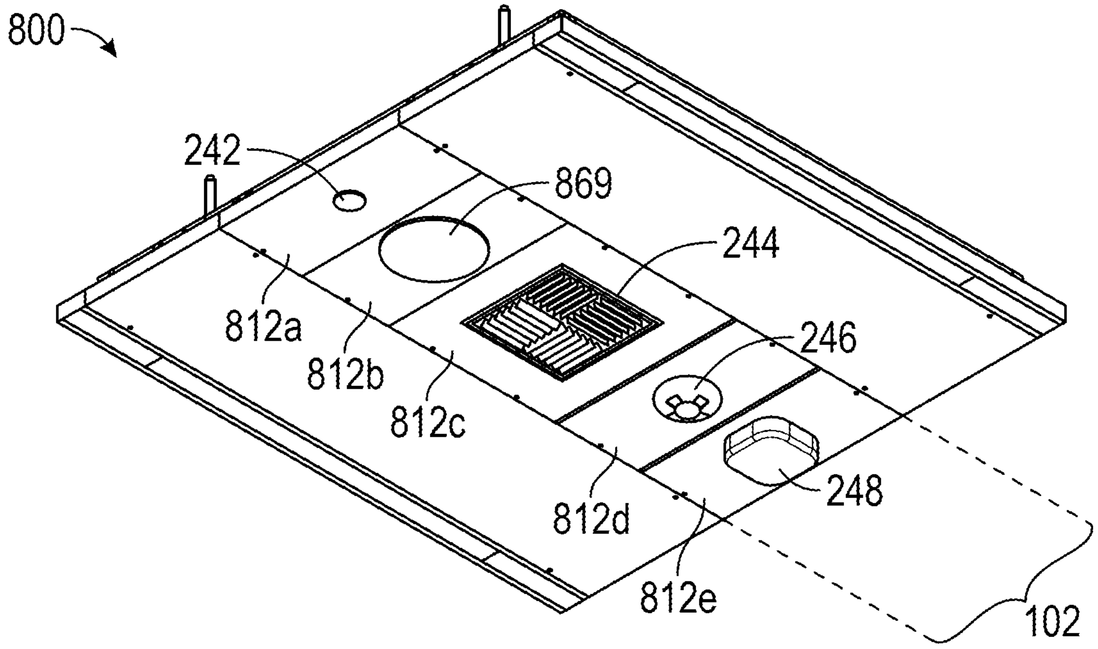
FIG. 8 is a perspective front view of an appliance hub configured in accordance with embodiments of the present technology.

FIG. 8 is a perspective front view of an appliance hub 800 configured in accordance with embodiments of the present technology. At least some aspects of the appliance hub 800 can be at least generally similar or identical in structure and/or function to one or more of the appliance hubs described previously herein. For example, in the illustrated embodiment the appliance hub 800 includes the first panel assembly 102, and the first panel assembly 102 includes the fire sprinkler cover 242, the diffuser 244, the fire alarm 246, and the Wi-Fi router 248. The first panel assembly 102 can further include a speaker 869. In the illustrated embodiment, each of these devices is mounted to a separate panel 812*a-e* included in the first panel assembly 102. More specifically, the fire sprinkler cover 242 is mounted to a first panel 812*a*, the speaker 869 is mounted to a second panel 812*b*, the diffuser is mounted to a third panel 812*c*, the fire alarm 246 is mounted to a fourth panel 812*d*, and the Wi-Fi router 248 is mounted to a fifth panel 812*e*.

Figure 9A:
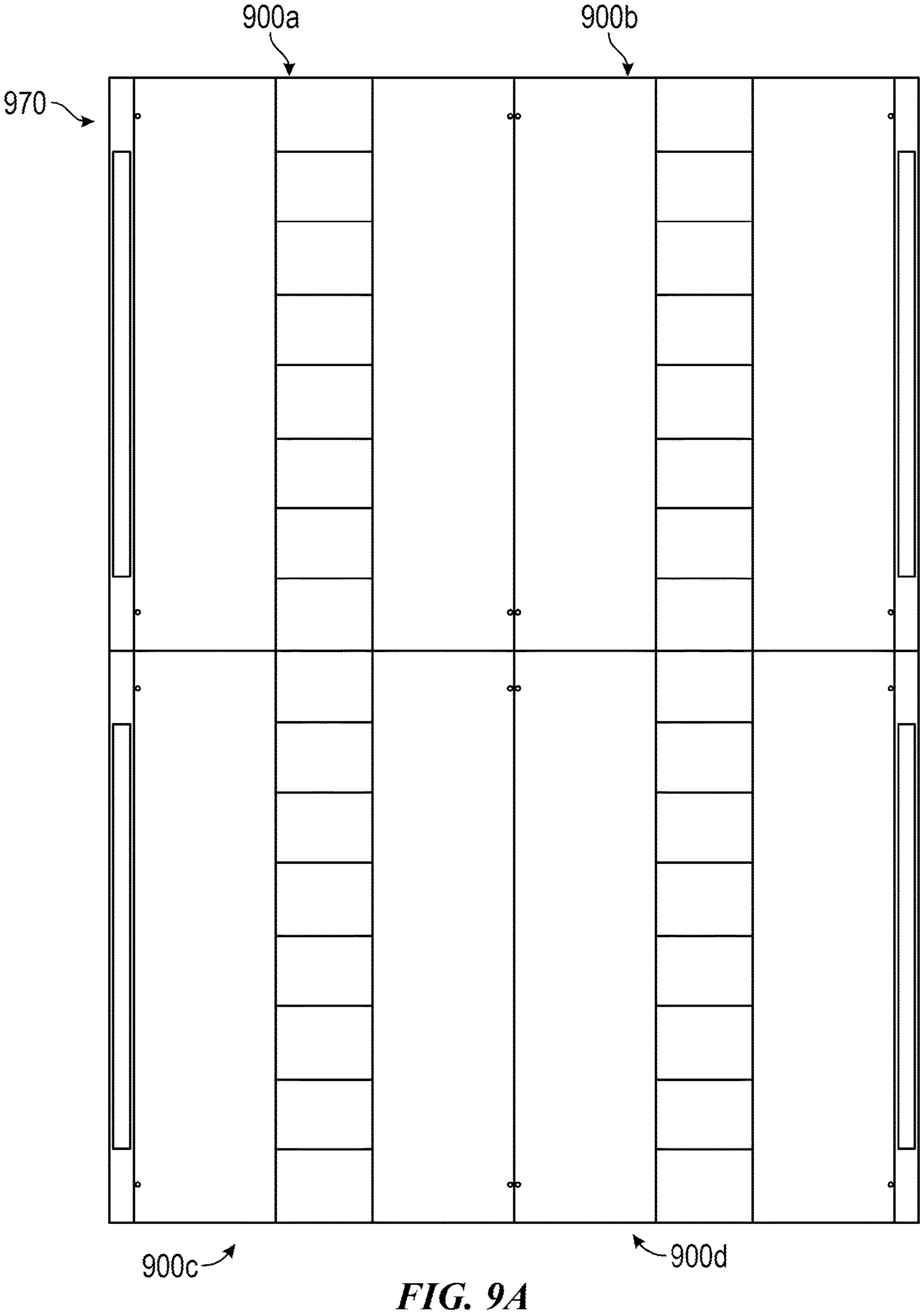
FIG. 9A is a front view of an appliance hub assembly configured in accordance with embodiments of the present technology.

FIG. 9A is a perspective front view of an appliance hub assembly 970 configured in accordance with embodiments of the present technology. The appliance hub assembly 970 can include multiple appliance hubs 900 (individually identified as a first appliance hub 900*a*, a second appliance hub 900*b*, a third appliance hub 900*c*, and a fourth appliance hub 900*d* in FIG. 9A), each of which can include one or more aspects that are at least generally similar of identical in structure and/or function to one or more of the other appliance hubs described herein. Although the appliance hub assembly 970 includes four appliance hubs 900 arranged in a two hub by two hub grid in the embodiment illustrated in FIG. 9A, in other embodiments the appliance hub assembly 970 can include more or fewer appliance hubs 900 and/or appliance hubs 900 in another suitable arrangement. For example, the appliance hub assembly 970 can include at least two, three, five, six, eight, ten, or more appliance hubs. Additionally, or alternatively, the appliance hub assembly 970 can include appliance hubs 900 arranged in a grid including one or more rows and/or one or more columns, a triangular pattern, a circular pattern, or another suitable arrangement.

Figure 9B:
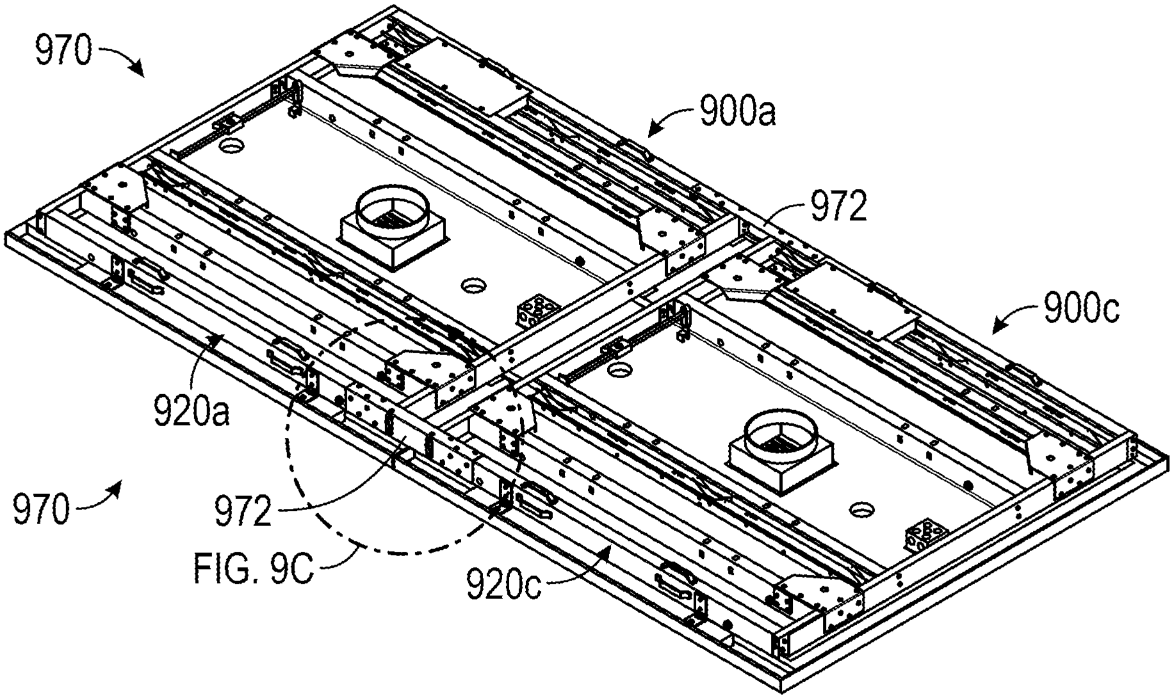
FIG. 9B is a back perspective view of two appliance hubs of the appliance hub assembly of FIG. 9A.
Figure 9C:
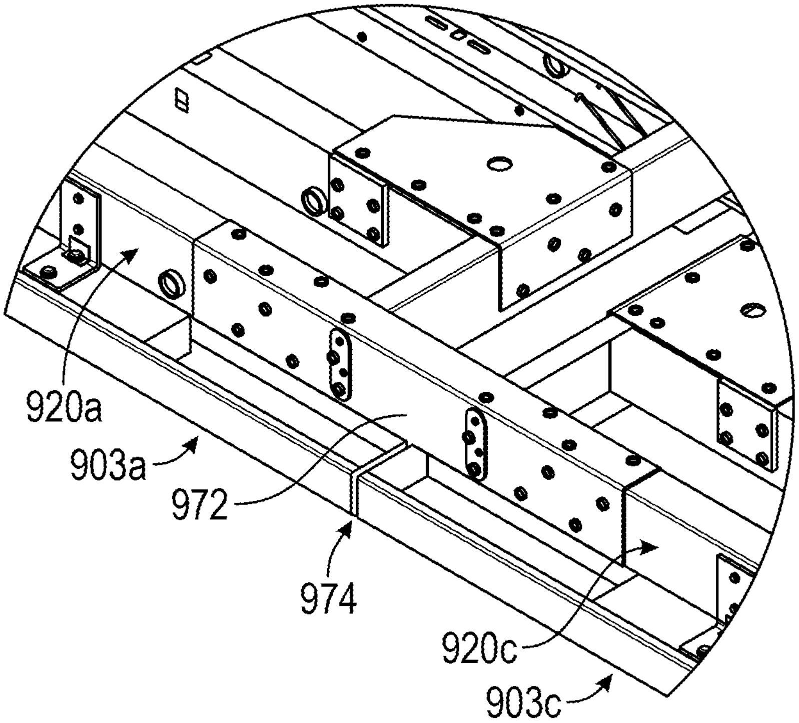
FIG. 9C is an enlarged perspective view of a connection between two appliance hubs of the appliance hub assembly of FIG. 9A.
Figure 9D:
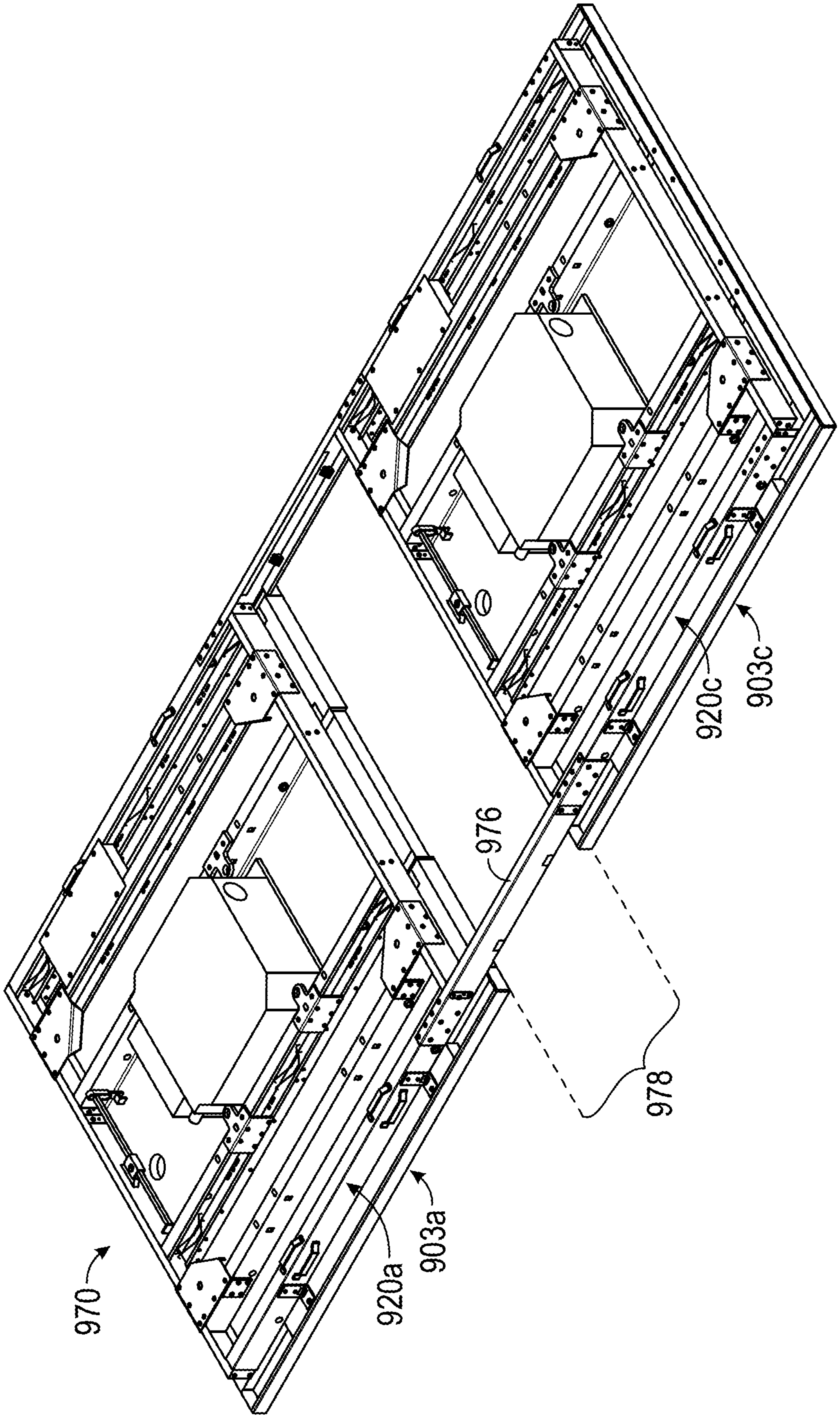
FIG. 9D is a back perspective view of another connection between two appliance hubs of the appliance hub assembly of FIG. 9A, in accordance with embodiments of the present technology.

FIGS. 9B-9D are perspective views of two appliance hubs 900*a*, 900*c* of the appliance hub assembly 970. More specifically, FIG. 9B is a back perspective view of two appliance hubs of the appliance hub assembly of FIG. 9A, FIG. 9C is an enlarged perspective view of a connection between two appliance hubs 900*a*, 900*c* of the appliance hub assembly 970 of FIG. 9A, and FIG. 9D is a back perspective view of another connection between the two appliance hubs 900*a*, 900*c*. The appliance hubs 900*a*, 900*c* can be coupled together using one or more brackets or coupling members 972. Individual ones of the coupling members 972 can be configured to couple to the respective frames 920*a*, 920*c* of the appliance hubs 900*a*, 900*c*. As best shown in FIG. 9C, the coupling members 972 can be configured such that the respective panels 903*a*, 903*c* of the appliance hubs 900*a*, 900*c* abut each other at an interface 974. In other embodiments, such as shown in FIG. 9D, bracket or coupling member 976 is configured to be coupled to the frames 920*a*, 920*c* and spaced apart the panels 903*a*, 903*c* of the appliance hubs 900*a*, 900*c* to form a gap or channel 978 therebetween. In some embodiments, one or more other panels, such as an acoustic panel or any other suitable panel described herein (not shown in FIG. 9D for the sake of illustrative clarity), can be positioned in the gap 978 and/or coupled to the bracket(s) 976. Although only the two appliance hubs 900*a*, 900*c* are shown in FIGS. 9B-9D, it will be appreciated that in other embodiments more appliance hubs can be coupled together, for example, using additional brackets, which can be configured to couple adjacent appliance hubs together. In these and other embodiments, the appliance hub assembly 970 can include one or more appliance hubs that are positioned within the same enclosure but not coupled together, and/or a combination of coupled and uncoupled appliance hubs.

Figure 10:
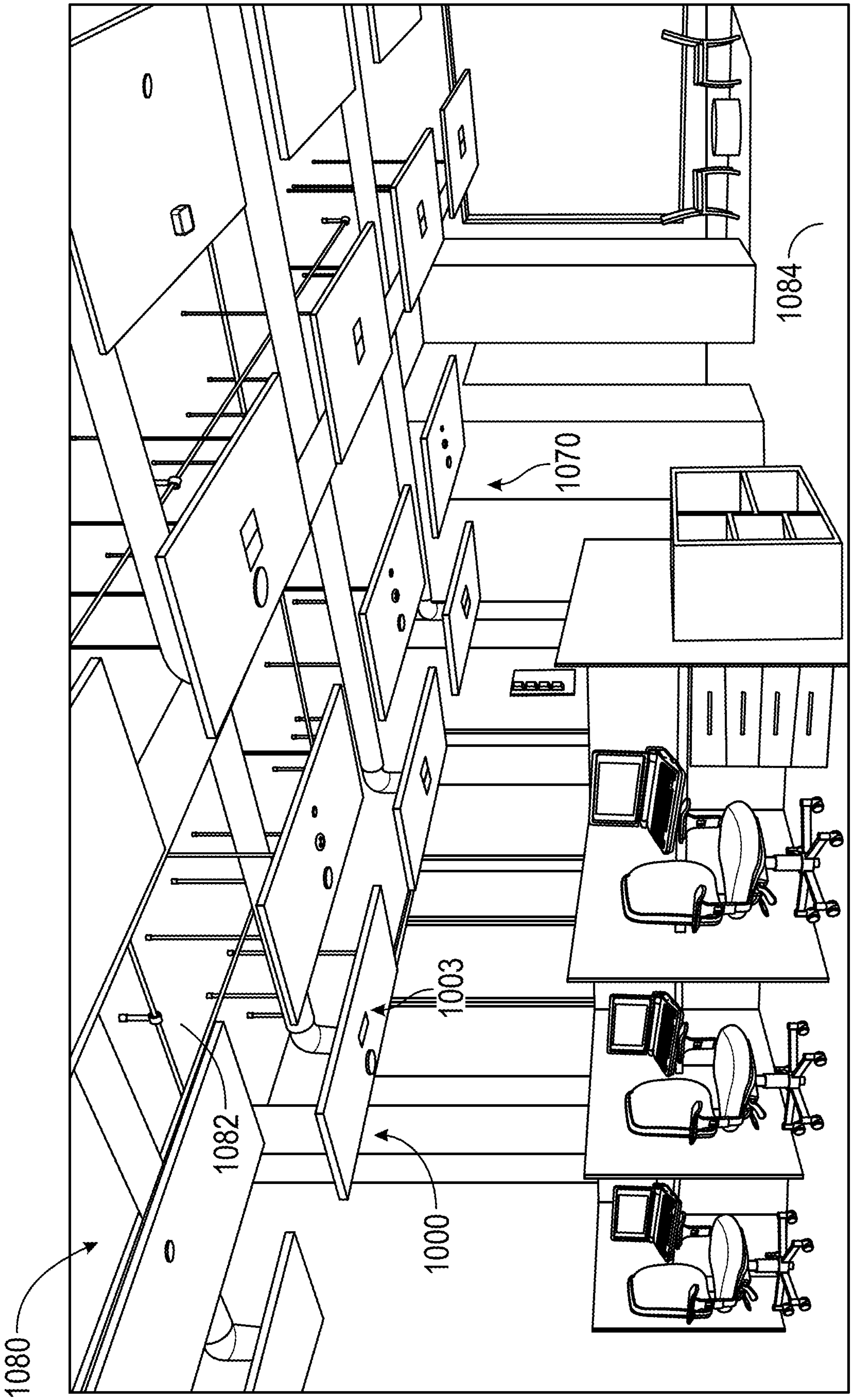
FIG. 10 illustrates an appliance hub system in an office setting in accordance with embodiments of the present technology.

FIG. 10 illustrates an appliance hub system 1070 in an enclosure or office setting 1080 in accordance with embodiments of the present technology. Individual appliance hubs 1000 (only one labeled in FIG. 10) of the appliance hub system 1070 can be mounted to an upper surface or ceiling 1082 of the office setting 1080, such that one or more panels 1003 of the appliance hubs 1000 can face in a downward direction, such as toward a lower surface or floor 1084 of the office setting 1080. In the illustrated embodiment the appliance hubs 1000 of the appliance hub system 1070 are spaced apart from one another in a rectangular grid pattern. In other embodiments, the appliance hubs 1000 of the appliance hub system 1070 can have other arrangements.

Figure 11:
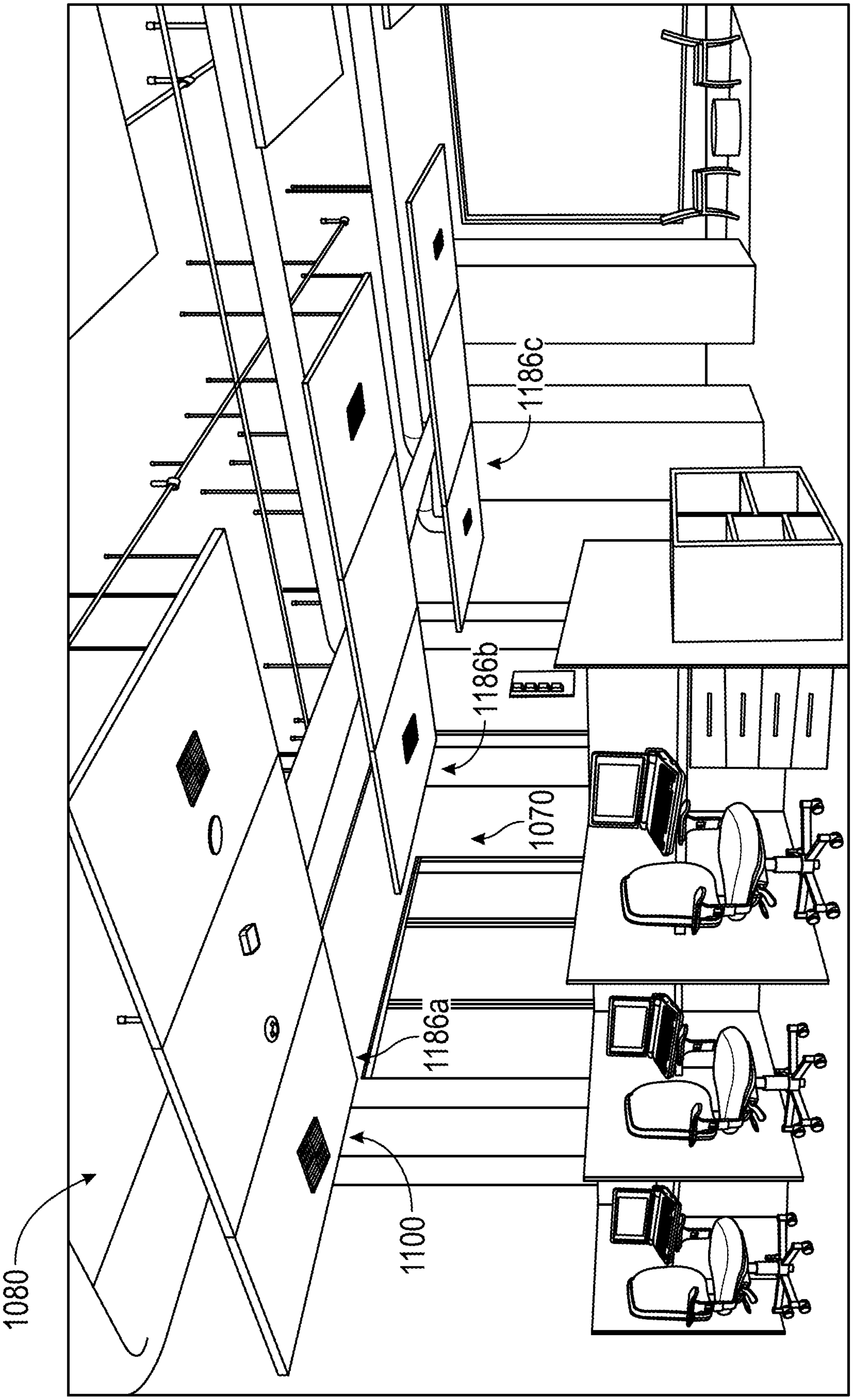
FIG. 11 illustrates another appliance hub system in an office setting in accordance with embodiments of the present technology.

FIG. 11 illustrates another appliance hub system 1170 in the office setting 1080 in accordance with embodiments of the present technology. In contrast to the appliance hub system 1070 of FIG. 10, the appliance hub system 1170 includes one or more appliance hubs 1100 (only one labeled in FIG. 11) that are coupled together, e.g., to form one or more appliance hub assemblies or groups. More specifically, in the illustrated embodiment the appliance hub system 1170 includes three groups 1186 (individually identified as a first group 1186*a* a second group 1186*b*, and a third group 1186*c*) of appliance hubs 1100, and each of the groups 1086*a-c* includes three appliance hubs 1100 that are coupled together in a single row. In other embodiments, the appliance hub system 1170 can include more or fewer groups 1186, more or fewer appliance hubs 1100 per group 1186, and/or appliance hubs 1100 in other arrangements within one or more of the groups 1186.

Figure 12:
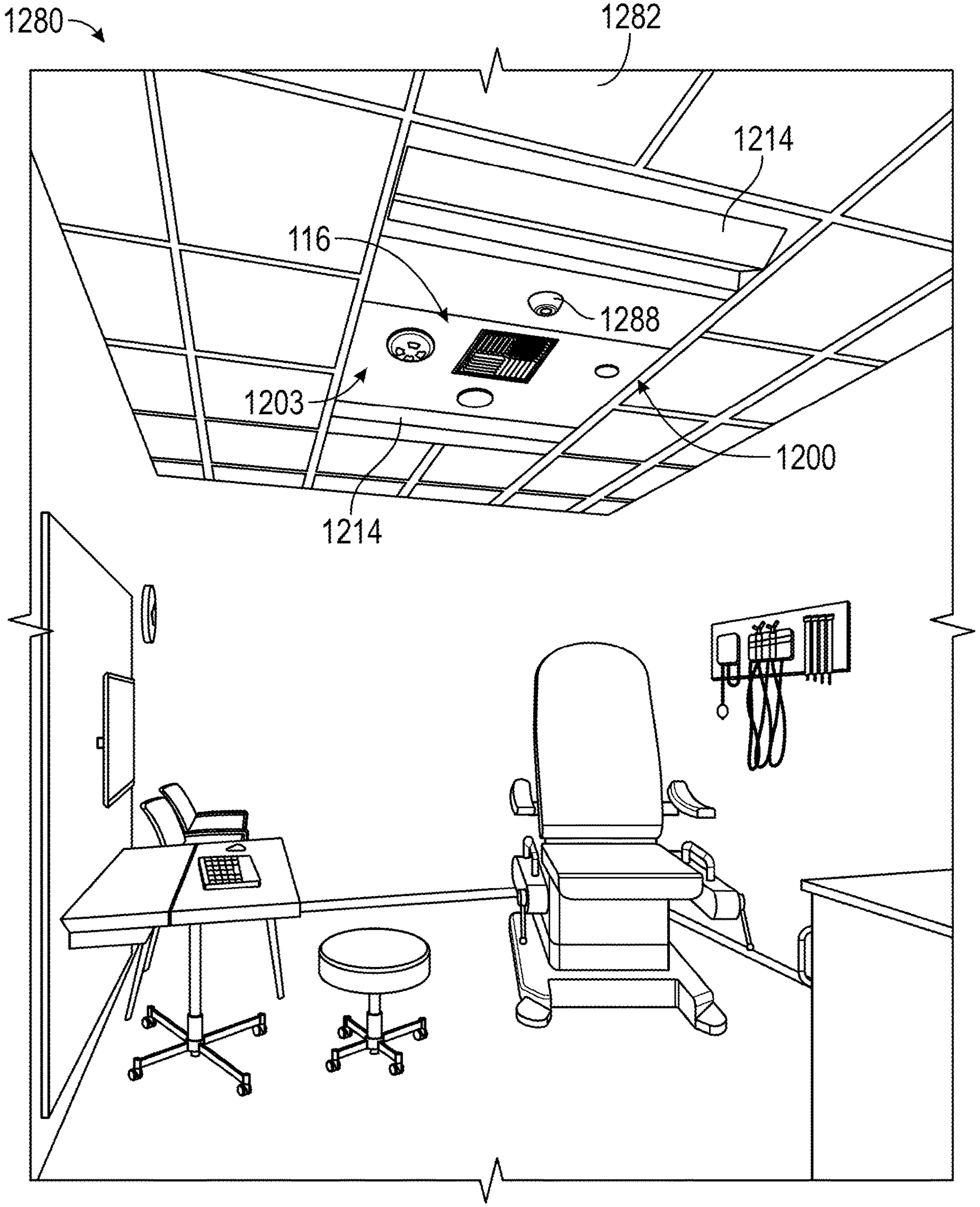
FIG. 12 illustrates an appliance hub in a clinical setting in accordance with embodiments of the present technology.

FIG. 12 illustrates an appliance hub 1200 in an enclosure or clinical setting 1280 in accordance with embodiments of the present technology. The appliance hub 1200 can positioned within the clinical setting 1280 such that one or more panels 1203 of the appliance hub 1200 are generally or substantially flush or coplanar with an upper surface of ceiling 1282 of the clinical setting 1280. In other embodiments, the appliance hub 1200 can be configured to be recessed within or protruding out from the ceiling 1282. The appliance hub 1200 further includes diffused lighting elements 1214 recessed from the panels 1203 and configured to reduce or prevent glare within the clinical setting 1280, an occupancy sensor 1288, and one or more of the devices 116 described previously herein. The occupancy sensor 1288 can be configured to alter or adjust the operation of one or more of the lighting elements 1214 and/or the other devices 116. For example, when the occupancy sensor 1288 detects that the clinical setting 1280 is occupied, the occupancy sensor 1288 can be configured to cause individual ones of the lighting elements 1214 to turn on or brighten. Similarly, when the occupancy sensor 1288 detects that the clinical setting 1280 is empty, the occupancy sensor 1288 can be configured to cause individual ones of the lighting elements 1214 to turn off or dim.

Figure 13:
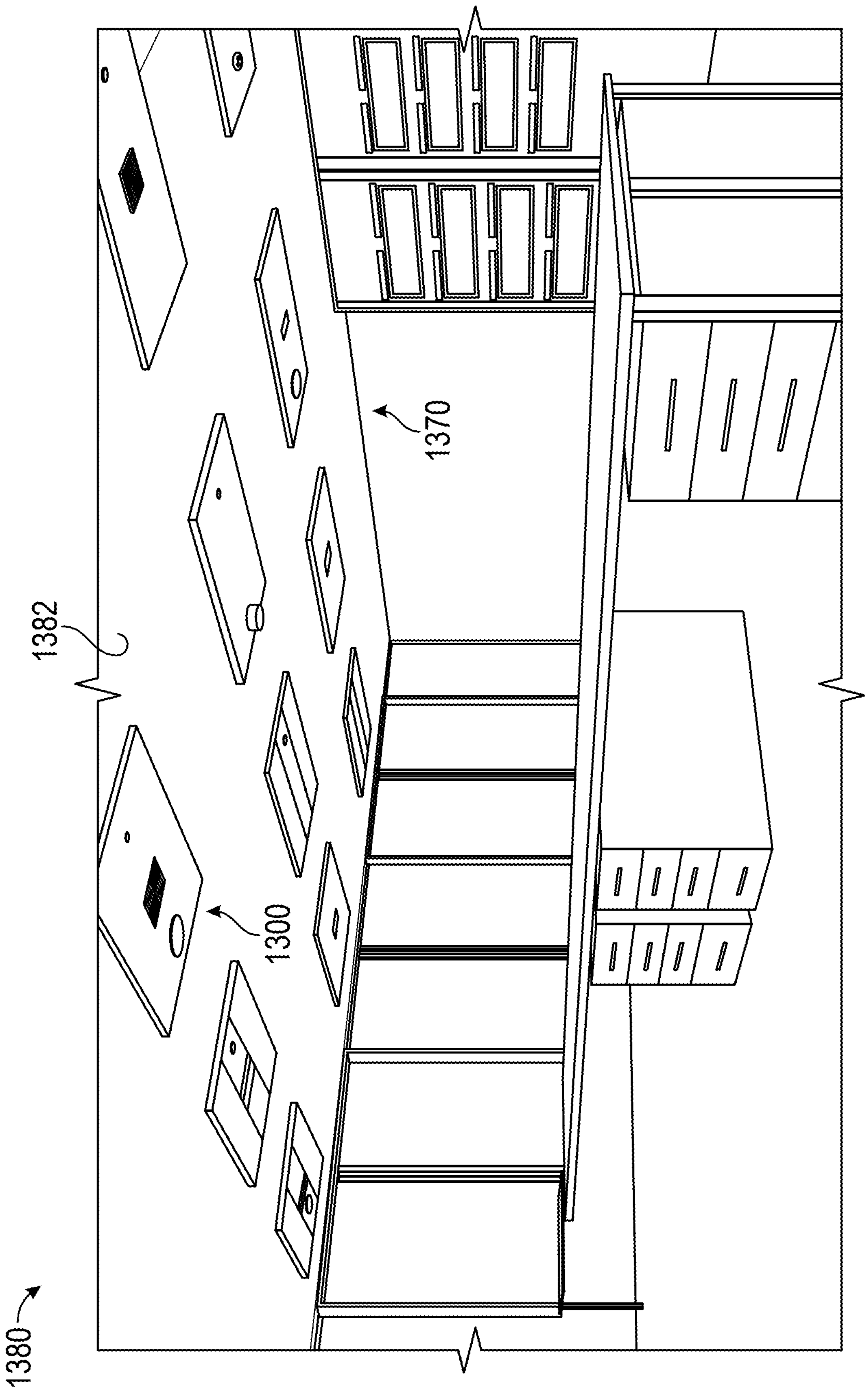
FIG. 13 illustrates an appliance hub system positioned in a laboratory setting in accordance with embodiments of the present technology.

FIG. 13 illustrates an appliance hub system 1370 positioned in an enclosure or classroom setting 1380 in accordance with embodiments of the present technology. In contrast to the appliance hub 1200 of FIG. 12, the appliance hub system 1370 includes appliance hubs 1300 (only one labeled in FIG. 13) that protrude downwardly from an upper surface or ceiling 1382 of the classroom setting 1380.

Figure 14A:
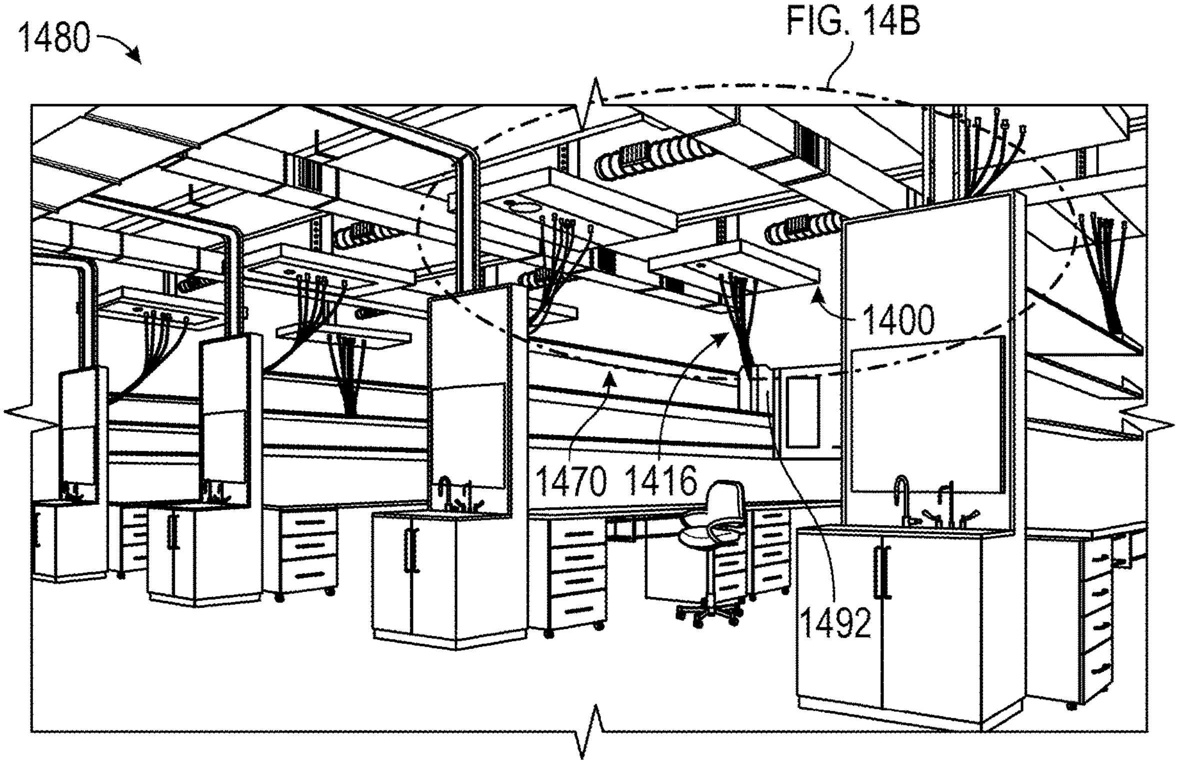
FIGS. 14A and 14B illustrate an appliance hub system positioned in a laboratory setting in accordance with embodiments of the present technology.
Figure 14B:
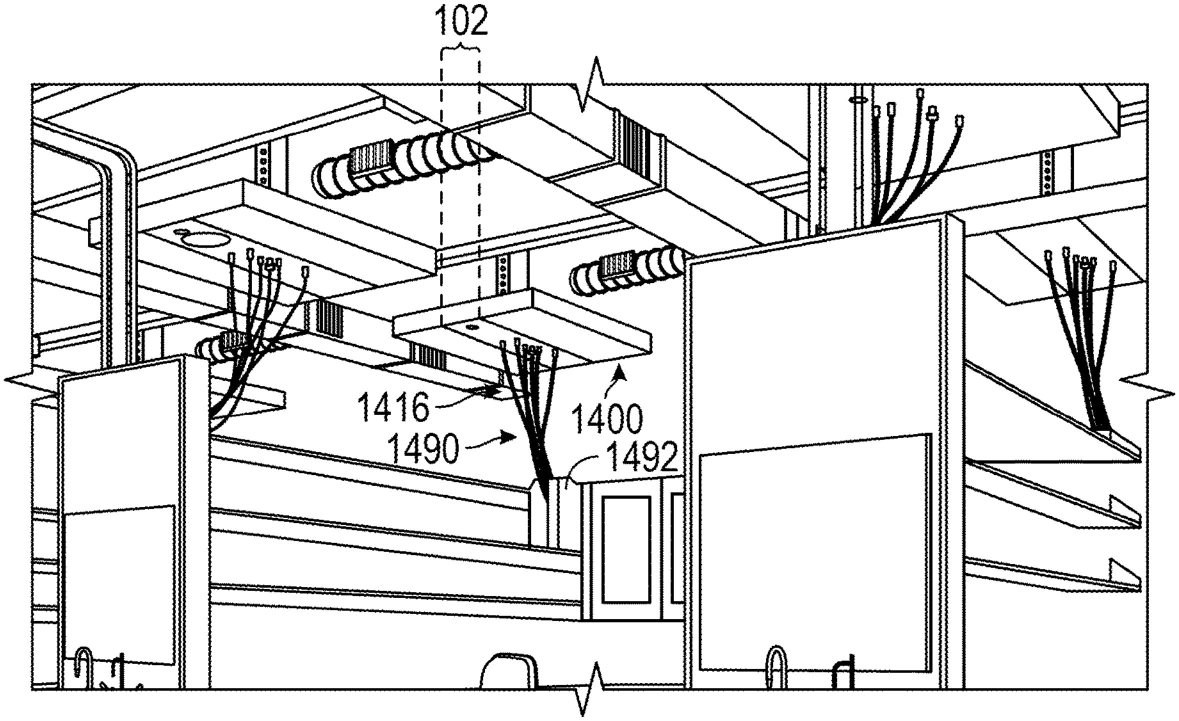

FIGS. 14A and 14B illustrate an appliance hub system 1470 positioned in an enclosure or laboratory setting 1480 in accordance with embodiments of the present technology. The appliance hub system 1470 can include one or more appliance hubs 1400 (only one labeled in FIGS. 14A and 14B) that have one or more devices 1416 operably coupled to one or more other structures 1492 also positioned within the laboratory setting 1480. For example, as best shown in FIG. 14B, the devices 1416 in the first panel assembly 102 of the appliance hub 1400 include one or more lines or cables 1490 coupled to the structure 1492. The cables 1490 can include one or more power cables, hot water lines, cold water lines, vacuum lines, gas lines (e.g., compressed air, $CO_2$, Nitrogen gas, etc.), data ports, ethernet cables, A/V cables, and/or other suitable cables. In the illustrated embodiment, the cables 1490 are each operably connected to the structure 1492 (e.g., a laboratory bench). In other embodiments, individual ones of the cables 1490 can be free hanging, coupled to other structures within the enclosure, coupled to appliance hubs, and/or coupled to other portions of the laboratory setting 1480.

Figure 15:
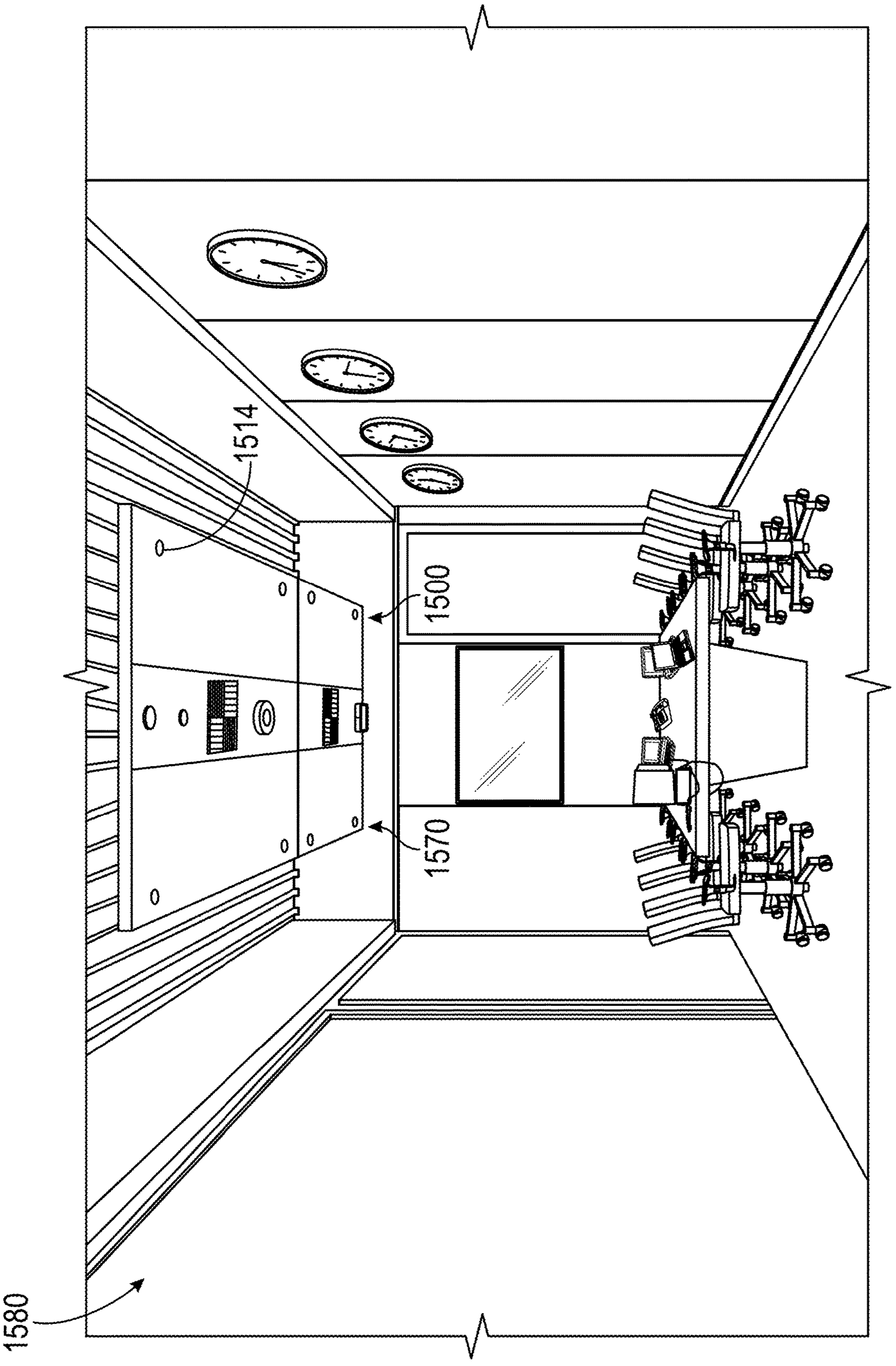
FIG. 15 illustrates an appliance hub system positioned within a conference room setting in accordance with embodiments of the present technology.

FIG. 15 illustrates an appliance hub system 1570 positioned within an enclosure or conference room setting 1580 in accordance with embodiments of the present technology. The appliance hub system 1570 includes two appliance hubs 1500 (only one labeled in FIG. 15), and the appliance hubs 1500 include circular lighting elements 1514. In other embodiments, one or both the appliance hubs 1500 can include other lighting elements, in addition to or in lieu of the circular lighting elements 1514.

Further Examples

The following examples are illustrative of several embodiments of the present technology:

1. An appliance hub, comprising:

a frame assembly configured to be mounted to an upper portion of the enclosure;

multiple panel assemblies coupled to the frame assembly, the multiple panel assemblies comprises at least a first panel assembly and a second panel assembly, wherein at least one of the multiple panel assemblies comprises a panel removably coupled to the frame assembly;

a climate control apparatus mounted to the first panel assembly, the climate control apparatus configured to regulate a temperature within the enclosure; and a lighting element mounted to one of the multiple panel assemblies and configured to provide light within the enclosure.

2. The appliance hub of example 1 wherein:

the multiple panel assemblies further comprises a third panel assembly;

the first panel assembly has a first side and a second side opposite the first side;

the second panel assembly coupled to the frame assembly adjacent the first side of the first panel assembly;

the third panel assembly coupled to the frame assembly adjacent the second side of the first panel assembly;

the lighting element being a first lighting element of multiple lighting elements, wherein the first lighting element is mounted to the second panel assembly; and the multiple lighting elements further comprise a second lighting element mounted to the third panel assembly.

3. The appliance hub of example 2, further comprising:

a first acoustic panel configured to be coupled to the frame assembly between the first panel assembly and the second panel assembly; and a second acoustic panel configured to be coupled to the frame assembly between the first panel assembly and the third panel assembly, wherein the first acoustic panel and the second acoustic panel are further configured to attenuate sound within the enclosure.

4. The appliance hub of example 3 wherein the first panel assembly has a first width, and wherein one or both of the first acoustic panel and the second acoustic panel have a second width greater than the first width.

5. The appliance hub of example 3 wherein the first panel assembly has a first width, and wherein one or both of the first acoustic panel and the second acoustic panel have a second width less than the first width.

6. The appliance hub of example 2 wherein at least one of the first panel assembly, the second panel assembly, and the third panel assembly are removably coupled to the frame assembly.

7. The appliance hub of any one of the preceding examples, further comprising:

a fire alarm mounted to the first panel assembly; or a communication component mounted to the first panel assembly.

8. The appliance hub of any one of the preceding examples, further comprising a sensor, a fire suppression component, a climate control apparatus, a communication component, and/or a sound dampening component mounted to the first panel assembly.

9. The appliance hub of any one of the preceding examples wherein the climate control apparatus comprises a forced air vent.

10. The appliance hub of any one of the preceding examples wherein the first panel assembly comprises at least three panels.

11. The appliance hub of example 10 wherein the climate control apparatus is c mounted to a first one of the at least three panels, the appliance hub further comprising:

a fire alarm mounted to a second one of the at least three panels;

a fire suppression component mounted to the second one of the at least three panels; and a communication component mounted to a third one of the at least three panels.

12. The appliance hub of any one of the preceding examples wherein the frame assembly comprises a plurality of struts, and wherein individual ones of the plurality of struts are coupled to at least one of the first panel assembly and the second panel assembly.

13. The appliance hub of example 12 wherein individual ones of the plurality of struts include one or more attachment points, wherein the first panel assembly and the second panel assembly include one or more attachment components, and wherein individual ones of the one or more attachment components are configured to be releasably received by a corresponding one of the attachment points to allow for remove of the first panel assembly and/or the second panel assembly after installation of the appliance hub.

14. The appliance hub of example 13 wherein individual ones of the one or more attachment components include a torsion spring, a spring clip, a quick-release pin, and/or a retractable cable mount.

15. The appliance hub of any one of the preceding examples wherein the first panel assembly, the second panel assembly, and the third panel assembly together define a side surface of the appliance hub, the appliance hub further comprising a trim panel configured to be coupled to the side to partially or fully cover the side surface.

16. The appliance hub of any one of the preceding examples wherein the first panel assembly has a first width, wherein the second panel assembly has a second width, wherein the third panel assembly has a third width, and wherein the first width is greater than one or both of the second width and the third width.

17. The appliance hub of any one of the preceding examples wherein the lighting element comprises light-emitting diodes, an incandescent socket and bulb, a halogen socket and bulb, a fluorescent socket and bulb, a smart bulb, a downlight, an uplight, a linear light, a recessed lights, and/or pendant fixture light.

18. The appliance hub of any one of the preceding examples wherein the panel comprises an attachment component removably coupling a portion of the panel to the frame assembly, and wherein the attachment component comprises a torsion spring, a spring clip, a quick-release pin, and/or a retractable cable mount.

19. An appliance hub, comprising:

a frame assembly configured to be mounted to an overhead portion of an enclosure;

a first panel assembly coupled to the frame assembly, the first panel assembly having a first side and a second side opposite the first side;

a second panel assembly coupled to the frame assembly to the first side of the first panel assembly; and a third panel assembly coupled to the frame assembly to the second side of the first panel assembly, wherein the first panel assembly comprises a plurality of panels between the second panel assembly and the third panel assembly, wherein one or more of the plurality of panels include a device mounted thereto, and wherein a first panel of the plurality of panels comprises an attachment component removably coupling the first panel to the frame assembly.

20. The appliance hub of example 19 wherein the device comprises a sensor, a fire suppression component, a climate control apparatus, a communication component, and/or a sound dampening component.

21. The appliance hub of any one of the preceding examples wherein individual ones of the plurality of panels are configured to be removed from the frame assembly after the appliance hub is mounted to the overhead portion of the enclosure and replaced with one or more other panels.

22. The appliance hub of any one of the preceding examples wherein the attachment component comprises at least one torsion spring.

23. The appliance hub of any one of the preceding examples, further comprising:

a lighting element mounted on the second panel assembly and/or the third panel assembly.

24. The appliance hub of any one of the preceding examples, further comprising:

a forced air vent mounted to the first panel assembly and configured to be connected to an air duct.

25. An appliance hub assembly system, comprising:

a first appliance hub comprising— a first frame assembly configured to be positioned in an upper portion of an enclosure;

a first panel assembly configured to be coupled to the first frame assembly, the first panel assembly having a first side and a second side opposite the first side;

a second panel assembly configured to be coupled to the first frame assembly to the first side of the first panel assembly;

a third panel assembly configured to be coupled to the first frame assembly to the second side of the first panel assembly;

a first device mounted to the first panel assembly; and a second appliance hub, including— a second frame assembly configured to be positioned in the upper portion of the enclosure;

a fourth panel assembly configured to be coupled to the second frame assembly, the fourth panel assembly having a first side and a second side opposite the first side;

a fifth panel assembly configured to be coupled to the second frame assembly to the first side of the fourth panel assembly;

a sixth panel assembly configured to be coupled to the second frame assembly to the second side of the fourth panel assembly; and a second device mounted to the fourth panel assembly.

26. The appliance hub system of example 25 wherein one or both of the first device and the second device include at least one of a sensor, a fire suppression component, a climate control apparatus, a communication component, or a sound dampening component.

27. The appliance hub system of any one of the preceding examples, further comprising a bracket configured to couple the first frame assembly to the second frame assembly.

CONCLUSION

In some embodiments, specific naming conventions can be established and associated with specific appliance hubs and components thereof. Use of specific/preset names or identifiers for the appliance hubs and components can allow for reliable and accurate tracking of the appliance hubs and components. Using consistent names/identifiers for like parts can also reduce complications during installation, repair, refurbishment, customization, replacement, and other operations conduct with or on the appliance hubs. Consistent naming/identifying of appliance hubs and components thereof can also improve machine learning associated with data detection and recordation from the appliance hubs and components thereof by improving the accuracy of assessments that can be made during analysis of the collected data (e.g., reliable attribution of location and type features of the data—such as temperature data from a specific room or location within a room).

It may be desirable for manufacturing, marketing, inventory, and other purposes to have preset appliance hub "models," wherein each model has a preset combination of components. The present combination of components for a given model can be configured for certain settings (e.g., classrooms, offices, hallways, conference rooms, cafeterias, warehouses, etc.). For example, a base model might include a hanging kit (e.g., hangers, fasteners, etc.) configured to facilitate physical installation of the appliance hub. The base model may include a substrate, lighting elements, unique identifier(s) (e.g., QR code tag(s), Bluetooth® beacon(s), etc.), an acoustic material, and a light sensor. In some embodiments, an "A" model may include, in addition to one or all of the base model features, a chilled beam, fluid hoses, fire/smoke alarm speaker and/or strobes, an AV speaker, and/or a Wi-Fi access point and/or router. A "B" model may include, in addition to one or all of the features of the base model, an AV speaker, a fire/smoke alarm speaker and/or strobe, and/or a Wi-Fi access point and/or router.

In some embodiments, combining multiple components and associated functions (e.g., lights, sensors, climate control modules, sprinklers, speakers, etc.) into a single appliance hub can streamline permitting for new construction or retrofitting. For example, a single permit authority may be tasked with evaluating the appliance hub installations, rather than multiple permit authorities tasked with permitting the multiple different components.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. Moreover, the various embodiments described herein may also be combined to provide further embodiments. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment.

To the extent any materials incorporated herein by reference conflict with the present disclosure, the present disclosure controls.

Certain aspects of the present technology, including operation of one or more components of the appliance hubs described previously herein, may take the form of computer-executable instructions, including routines executed by a controller or other data processor. In some embodiments, a controller or other data processor is specifically programmed, configured, and/or constructed to perform one or more of these computer-executable instructions. Furthermore, some aspects of the present technology may take the form of data (e.g., non-transitory data) stored or distributed on computer-readable media, including magnetic or optically readable and/or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

Reference throughout this specification to relative terms such as, for example, "generally," "approximately," "substantially," and "about" are used herein to mean the stated value plus or minus 10%.

Unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. Directional terms, such as "upper," "lower," "front," "back," "vertical," and "horizontal," may be used herein to express and clarify the relationship between various elements. It should be understood that such terms do not denote absolute orientation. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An appliance hub, comprising:

a frame assembly comprising a plurality of struts and configured to be mounted to an upper portion of an enclosure, wherein individual ones of the plurality of struts include one or more attachment points;

multiple panel assemblies coupled to the frame assembly, the multiple panel assemblies comprising at least a first panel assembly and a second panel assembly, wherein— the first panel assembly and the second panel assembly include one or more attachment components, individual ones of the one or more attachment components are configured to be releasably received by a corresponding one of the one or more attachment points to allow for removal of the first panel assembly and/or the second panel assembly after installation of the appliance hub, and at least one of the multiple panel assemblies comprises a panel removably coupled to the frame assembly;

a climate control apparatus mounted to the first panel assembly, the climate control apparatus configured to regulate a temperature within the enclosure; and a lighting element mounted to one of the multiple panel assemblies and configured to provide light within the enclosure.

2. The appliance hub of claim 1, further comprising:

a fire alarm mounted to the first panel assembly; or a communication component mounted to the first panel assembly.

3. The appliance hub of claim 1, further comprising a sensor, a fire suppression component, a communication component, and/or a sound dampening component mounted to the first panel assembly.

4. The appliance hub of claim 1 wherein the climate control apparatus comprises a forced air vent.

5. The appliance hub of claim 1 wherein the first panel assembly comprises at least three panels.

6. The appliance hub of claim 1 wherein individual ones of the one or more attachment components include a torsion spring, a spring clip, a quick-release pin, and/or a retractable cable mount.

7. The appliance hub of claim 1 wherein the first panel assembly and the second panel assembly together define a side surface of the appliance hub, the appliance hub further comprising a trim panel configured to be coupled to the side surface to partially or fully cover the side surface.

8. The appliance hub of claim 1 wherein the lighting element comprises light-emitting diodes, an incandescent socket and bulb, a halogen socket and bulb, a fluorescent socket and bulb, a smart bulb, a downlight, an uplight, a linear light, a recessed light, and/or a pendant fixture light.

9. The appliance hub of claim 1 wherein the panel comprises at least one of the one or more attachment components, and wherein the at least one attachment component comprises a torsion spring, a spring clip, a quick-release pin, and/or a retractable cable mount.

10. An appliance hub, comprising:

a frame assembly configured to be mounted to an upper portion of an enclosure;

multiple panel assemblies coupled to the frame assembly, the multiple panel assemblies comprising at least a first panel assembly, a second panel assembly, and a third panel assembly, wherein— the first panel assembly has a first side and a second side opposite the first side, the second panel assembly is coupled to the frame assembly adjacent the first side of the first panel assembly, the third panel assembly is coupled to the frame assembly adjacent the second side of the first panel assembly, and at least one of the multiple panel assemblies comprises a panel removably coupled to the frame assembly, a climate control apparatus mounted to the first panel assembly, the climate control apparatus configured to regulate a temperature within the enclosure; and multiple lighting elements configured to provide light within the enclosure, the multiple lighting elements comprising a first lighting element mounted to the second panel assembly and a second lighting element mounted to the third panel assembly.

11. The appliance hub of claim 10, further comprising:

a first acoustic panel configured to be coupled to the frame assembly between the first panel assembly and the second panel assembly; and a second acoustic panel configured to be coupled to the frame assembly between the first panel assembly and the third panel assembly, wherein the first acoustic panel and the second acoustic panel are further configured to attenuate sound within the enclosure.

12. The appliance hub of claim 11 wherein the first panel assembly has a first width, and wherein one or both of the first acoustic panel and the second acoustic panel have a second width greater than the first width.

13. The appliance hub of claim 11 wherein the first panel assembly has a first width, and wherein one or both of the first acoustic panel and the second acoustic panel have a second width less than the first width.

14. The appliance hub of claim 10 wherein at least one of the first panel assembly, the second panel assembly, and the third panel assembly are removably coupled to the frame assembly.

15. The appliance hub of claim 10 wherein the first panel assembly has a first width, wherein the second panel assembly has a second width, wherein the third panel assembly has a third width, and wherein the first width is greater than one or both of the second width and the third width.

16. An appliance hub, comprising:
a frame assembly configured to be mounted to an upper portion of an enclosure;
multiple panel assemblies coupled to the frame assembly, the multiple panel assemblies comprising at least a first panel assembly and a second panel assembly, wherein at least one of the multiple panel assemblies comprises a panel removably coupled to the frame assembly, and wherein the first panel assembly comprises at least three panels;
a climate control apparatus mounted to a first one of the at least three panels and configured to regulate a temperature within the enclosure;
a fire suppression component mounted to the second one of the at least three panels;
a communication component mounted to a third one of the at least three panels; and
a lighting element mounted to one of the multiple panel assemblies and configured to provide light within the enclosure.

17. An appliance hub, comprising:
a frame assembly comprising a plurality of struts and configured to be mounted to an overhead portion of an enclosure, wherein individual ones of the plurality of struts include one or more attachment points;
a first panel assembly coupled to the frame assembly, the first panel assembly having a first side and a second side opposite the first side;
a second panel assembly coupled to the frame assembly to the first side of the first panel assembly; and
a third panel assembly coupled to the frame assembly to the second side of the first panel assembly,
wherein the first panel assembly comprises a plurality of panels between the second panel assembly and the third panel assembly, wherein one or more of the plurality of panels include a device mounted thereto, and wherein a first panel of the plurality of panels comprises an attachment component configured to be releasably received by a corresponding one of the one or more attachment points to allow for removal of the first panel after installation of the appliance bub.

18. The appliance hub of claim 17 wherein the device comprises a sensor, a fire suppression component, a climate control apparatus, a communication component, and/or a sound dampening component.

19. The appliance hub of claim 17 wherein the attachment component is one of a plurality of attachment components and wherein each of the plurality of panels comprises one or more of the plurality of attachment components to allow each of the plurality of panels to be removed from the frame assembly after the appliance hub is mounted to the overhead portion of the enclosure and replaced with one or more other panels.

20. The appliance hub of claim 17 wherein the attachment component comprises at least one torsion spring.

21. The appliance hub of claim 17, further comprising:
a lighting element mounted on the second panel assembly and/or the third panel assembly.

22. The appliance hub of claim 17, further comprising:
a forced air vent mounted to the first panel assembly and configured to be connected to an air duct.

23. An appliance hub assembly system, comprising:
a first appliance hub comprising—
a first frame assembly comprising a plurality of first struts and configured to be positioned in an upper portion of an enclosure, wherein individual ones of the plurality of first struts include one or more first attachment points;
a first panel assembly configured to be coupled to the first frame assembly, the first panel assembly having a first side and a second side opposite the first side;
a second panel assembly configured to be coupled to the first frame assembly to the first side of the first panel assembly;
a third panel assembly configured to be coupled to the first frame assembly to the second side of the first panel assembly;
wherein—
the first panel assembly comprises a plurality of first panels between the second panel assembly and the third panel assembly
individual panels of the plurality of first panels comprise a first attachment component configured to be releasably received by a corresponding one of the one or more first attachment points to allow for removal of the individual first panels after installation of the first appliance hub, and
at least one of the plurality of first panels comprises a first device mounted thereto; and
a second appliance hub, including—
a second frame assembly comprising a plurality of second struts and configured to be positioned in the upper portion of the enclosure, wherein individual ones of the plurality of second struts include one or more second attachment points;
a fourth panel assembly configured to be coupled to the second frame assembly, the fourth panel assembly having a first side and a second side opposite the first side;
a fifth panel assembly configured to be coupled to the second frame assembly to the first side of the fourth panel assembly;
a sixth panel assembly configured to be coupled to the second frame assembly to the second side of the fourth panel assembly;
wherein—
the fourth panel assembly comprises a plurality of second panels between the fifth panel assembly and the sixth panel assembly,
individual panels of the plurality of second panels comprise a second attachment component configured to be releasably received by a corresponding one of the one or more second attachment points to allow for removal of the individual second panels after installation of the second appliance hub, and
at least one of the plurality of second panels comprises a second device mounted thereto.

24. The appliance hub assembly system of claim 23 wherein one or both of the first device and the second device include at least one of a sensor, a fire suppression component, a climate control apparatus, a communication component, or a sound dampening component.

25. The appliance hub assembly system of claim 23, further comprising a bracket configured to couple the first frame assembly to the second frame assembly.

26. An appliance hub, comprising:

a panel assembly configured to be mounted at an overhead portion of an enclosure, the panel assembly comprising— a plurality of panels arranged in series, the plurality of panels comprising at least a first panel and a second panel, a first device mounted to the first panel, the first device comprising a temperature sensor, a humidity sensor a light sensor an indoor air quality sensor, a motion sensor a communication component, a fire suppression component, and/or a fire alarm, and a second device mounted to the second panel, the second device being different than the first device and comprising a temperature sensor, a humidity sensor, a light sensor an indoor air quality sensor, a motion sensor a communication component, a fire suppression component, and/or a fire alarm; and a lighting element coupled to a side of at least one of the plurality of panels, wherein the lighting element is configured to provide light to the enclosure.

27. The appliance hub of claim 26 wherein the second panel is positioned laterally from the first panel and wherein the lighting element is coupled to the second panel.

28. The appliance hub of claim 27 wherein the second panel and the panel assembly have a same length.

29. The appliance hub of claim 27 wherein the first panel and the second panel have a same length.

30. The appliance hub of claim 26 wherein the first device is the temperature sensor, the humidity sensor, the light sensor, the indoor air quality sensor, or the motion sensor.

31. The appliance hub of claim 26 wherein the first panel and the second panel are aligned in a direction parallel to a longitudinal axis of the lighting element, wherein the first panel and the second panel are positioned a same distance from the lighting element.

32. The appliance hub of claim 26, further comprising a frame assembly having a side, wherein the panel assembly and the lighting element are coupled to the side of the frame assembly.

33. The appliance hub of claim 32 wherein the first panel and the second panel are removably coupled to the side of the frame assembly.

34. The appliance hub of claim 26 wherein at least one of the plurality of panels is perforated to at least partially attenuate sound within the enclosure.

35. The appliance hub of claim 26 wherein the plurality of panels are arranged in series along a longitudinal axis, and wherein the lighting element extends parallel to the longitudinal axis.

36. The appliance hub of claim 26 wherein:

the lighting element is a first lighting element; and the second panel further comprises a second lighting element.

* * * * *